US012067755B1

(12) United States Patent
Nan et al.

(10) Patent No.: US 12,067,755 B1
(45) Date of Patent: Aug. 20, 2024

(54) METHODS AND APPARATUS FOR DETECTION-BASED OBJECT SEARCH USING EDGE COMPUTING

(71) Applicant: Verkada Inc., San Mateo, CA (US)

(72) Inventors: Hao Nan, Sunnyvale, CA (US); Thantham Madan, San Mateo, CA (US); Yunchao Gong, Los Altos, CA (US); Yi Xu, Belmont, CA (US); Yingjie Shen, Hayward, CA (US); Shiqi Wang, Daly City, CA (US); Rishabh Goyal, San Mateo, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/320,617

(22) Filed: May 19, 2023

(51) Int. Cl.
| | |
|---|---|
| *G06V 10/25* | (2022.01) |
| *G06F 3/04842* | (2022.01) |
| *G06F 3/14* | (2006.01) |
| *G06T 5/20* | (2006.01) |
| *G06V 20/40* | (2022.01) |

(52) U.S. Cl.
CPC .......... *G06V 10/25* (2022.01); *G06F 3/04842* (2013.01); *G06F 3/14* (2013.01); *G06T 5/20* (2013.01); *G06V 20/44* (2022.01); *G06T 2207/30242* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 8,688,675 | B2 | 4/2014 | Albers et al. |
| 9,361,521 | B1 | 6/2016 | McLean et al. |
| 11,429,664 | B1 | 8/2022 | Xu et al. |
| 2006/0256210 | A1 | 11/2006 | Ryall et al. |
| 2007/0257986 | A1 | 11/2007 | Ivanov et al. |
| 2007/0291118 | A1 | 12/2007 | Shu et al. |
| 2008/0091526 | A1* | 4/2008 | Shoemaker ........ G06Q 30/0257 705/14.69 |
| 2009/0238411 | A1* | 9/2009 | Adiletta ................. G06T 5/50 382/107 |
| 2010/0238285 | A1 | 9/2010 | DeSimone et al. |
| 2012/0062732 | A1 | 3/2012 | Marman et al. |

(Continued)

OTHER PUBLICATIONS

Albers, et al. "Smart Search & Retrieval on Video Databases," IEEE, 2006, 475-476.

(Continued)

*Primary Examiner* — Delomia L Gilliard
(74) *Attorney, Agent, or Firm* — COOLEY LLP

(57) ABSTRACT

A method for performing detection-based object searches includes receiving a user request indicating a region of interest, a timeframe of interest, or an object of interest. A signal is sent to cause execution of a query to identify object detections based on the user request. A signal representing at least one event identified in response to the query is received. For each event from the at least one event, a thumbnail image is identified based on the user request and using a ranking algorithm. A video frame identified based on the thumbnail image is received, and a video segment associated with the video frame is retrieved, A preview image clip that includes the video frame and the video segment is generated and displayed to a user associated with the user request.

21 Claims, 14 Drawing Sheets

(56) References Cited

U.S. PATENT DOCUMENTS

| | | | |
|---|---|---|---|
| 2013/0091470 A1* | 4/2013 | Sciammarella | G06F 3/0483 715/838 |
| 2013/0124998 A1* | 5/2013 | Pendergast | H04N 21/8549 715/723 |
| 2014/0369596 A1* | 12/2014 | Siskind | G06V 10/85 382/158 |
| 2015/0248429 A1* | 9/2015 | Pregueiro | G06F 16/9577 715/202 |
| 2016/0171852 A1 | 6/2016 | Lin et al. | |
| 2016/0232234 A1* | 8/2016 | Baek | G11B 27/031 |
| 2017/0024986 A1 | 1/2017 | Austin | |
| 2017/0078767 A1 | 3/2017 | Borel et al. | |
| 2018/0113577 A1 | 4/2018 | Burns et al. | |
| 2018/0115788 A1 | 4/2018 | Burns et al. | |
| 2019/0034734 A1 | 1/2019 | Yen et al. | |
| 2019/0043201 A1* | 2/2019 | Strong | G06V 10/96 |
| 2019/0244366 A1 | 8/2019 | Yu et al. | |
| 2019/0377957 A1* | 12/2019 | Johnston | G06V 20/41 |
| 2021/0027068 A1 | 1/2021 | Gayatri et al. | |
| 2021/0233255 A1 | 7/2021 | Celestini | |
| 2022/0254162 A1 | 8/2022 | Felemban et al. | |

OTHER PUBLICATIONS

Carta et al. "Efficient Thumbnail Identification through Object Recognition," WEBIST 2020—16th International Conference on Web Information Systems and Technologies, 2020, 209-216.

Yuan, et al. "Sentence Specified Dynamic Video Thumbnail Generation," arXiv:1908.04052v2 [cs.CV], Oct. 16, 2019, 14 pages.

Chen, L. et al. "Real-Time Multiple People Tracking with Deeply Learned Candidate Selection and Person Re-Identification," 2018 IEEE International Conference on Multimedia and expo (ICME). IEEE, 2018, 6 pages.

Gaikwad, B. et al. "End-to-end person re-identification: Real-time video surveillance over edge-cloud environment," Computers and Electrical Engineering, Apr. 2022, 99:107824, 14 pages.

Hata, T. et al. "Surveillance system with mega-pixel scalable transcoder," Visual Communications and Image Processing, 2007, 6508 SPIE, 13 pages.

Lu, J. et al. "Object-QA: Towards High Reliable Object Quality Assessment," arXiv preprint arXiv:2005.13116v1 [cs.CV] May 27, 2020, 9 pages.

Non-Final Office Action for U.S. Appl. No. 18/450,085 dated Oct. 31, 2023, 37 pages.

Non-Final Office Action for U.S. Appl. No. 18/320,467 dated Jul. 27, 2023, 30 pages.

Tissainayagam, P. et al. "Visual tracking with automatic motion model switching," Pattern Recognition, 2001, 34:641-660.

Co-pending U.S. Appl. No. 18/320,467, inventors Mwaura; David et al., filed May 19, 2023.

Co-pending U.S. Appl. No. 18/450,085, inventors Cao; Song et al., filed Aug. 15, 2023.

Final Office Action for U.S. Appl. No. 18/320,467 dated Dec. 20, 2023, 35 pages.

Notice of Allowance for U.S. Appl. No. 18/450,085 dated Feb. 29, 2024, 11 pages.

\* cited by examiner

METHODS AND APPARATUS FOR DETECTION-BASED OBJECT SEARCH USING EDGE COMPUTING

FIELD

The present disclosure generally relates to the field of image processing and computer vision. More specifically, the present disclosure is related to methods and apparatuses for performing detection-based object searches within video, using edge computing.

BACKGROUND

Object detection is a computer vision technique that can identify and localize objects found in video images or video streams. Known object-based searching and object detection can be computationally intensive and can consume large amounts of processing power, especially for large collections of video images or video streams. Additionally, some known object-based search techniques are prone to false positives or false negatives, in which cases search results can include irrelevant images, miss correct images, or return incorrect images due to issues with factors such as motion, lighting, posing, occlusion, and/or the like. A need therefore exists for a system that can efficiently and accurately compare detections of objects with detections of motion and compile an optimal visualization of events depicted in images or video streams.

SUMMARY

In one or more embodiments, a non-transitory, processor-readable medium stores instructions that, when executed by a processor, cause the processor to receive, at a processor, a user request indicating at least one of a region of interest associated with a display area, a timeframe of interest, or an object of interest. The non-transitory, processor-readable medium also stores instructions to cause the processor to send a signal to cause execution of a query to identify object detections based on the user request. The non-transitory, processor-readable medium also stores instructions to cause the processor to receive a signal representing at least one event identified in response to the query. For each event from the at least one event, the processor is further caused to identify a thumbnail image based on the user request and using a ranking algorithm. For each event from at least one event, the non-transitory, processor-readable medium also stores instructions to cause the processor to receive a video frame identified based on the thumbnail image. For each event from at least one event, the non-transitory, processor-readable medium also stores instructions to cause the processor to retrieve a video segment associated with the video frame. For each event from at least one event, the non-transitory, processor-readable medium also stores instructions to cause the processor to generate a preview image clip (e.g., a preview image sequence) that includes the video frame and the video segment. For each event from at least one event, the non-transitory, processor-readable medium also stores instructions to cause the processor to cause display of the preview image sequence to a user associated with the user request.

In one or more embodiments, a non-transitory, processor-readable medium stores instructions that, when executed by a processor, cause the processor to receive event data including a plurality of image frames generated by at least one sensor of a video camera. The non-transitory, processor-readable medium also stores instructions to cause the processor to filter the event data based on a user request, to produce filtered event data. The user request can indicate at least one of: a region of interest associated with a display area, a timeframe of interest, or an object of interest. For each event from a set of at least one event associated with the filtered event data, the non-transitory, processor-readable medium also stores instructions to cause the processor to select a thumbnail preview based on the user request, and cause transmission of a signal representing the selected thumbnail preview to cause display of the selected thumbnail preview to a user associated with the user request via a graphical user interface (GUI) of a compute device of the user, e.g., as part of a preview image clip or sequence.

In one or more embodiments, a non-transitory, processor-readable medium stores instructions that, when executed by a processor, cause the processor to cause transmission of a signal representing a query based on a user request. The user request indicates at least one of: a region of interest associated with a display area, a timeframe of interest, or an object of interest. The non-transitory, processor-readable medium also stores instructions to cause the processor to receive a signal representing a thumbnail preview in response to the query. The thumbnail preview includes motion detection data generated by at least one sensor of a video camera. The non-transitory, processor-readable medium also stores instructions to cause the processor to cause display, via a graphical user interface (GUI) of a user associated with the user request, of a preview image clip that includes the thumbnail preview and the video segment, such that the thumbnail preview transitions to the video segment in response to a user interaction with the preview image clip. The non-transitory, processor-readable medium also stores instructions to cause the processor to cause display, via the GUI and concurrently with the display of the preview sequence clip, of at least one hyperzoom image.

DETAILED DESCRIPTION

Figure 1:
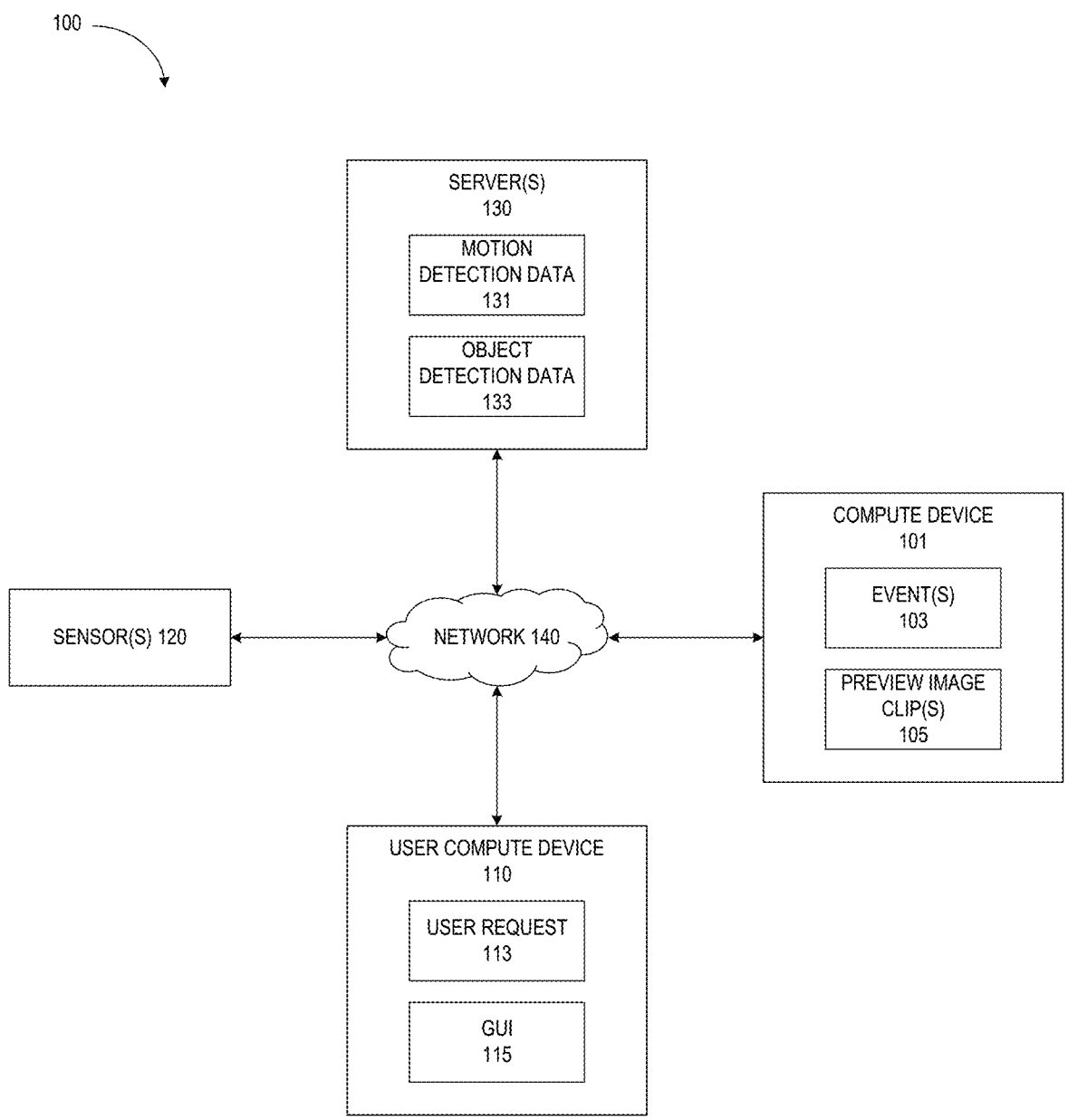
FIG. 1 is a block diagram illustrating a system for detection-based object search, according to some embodiments.

Object-based search is a computer vision technique that can search video images or video streams of objects detected using object detection, in some instances using deep learning models and recognition algorithms to extract features from video images or video streams. One or more embodiments of the present disclosure can compare detections of objects (i.e., instances of object detection) with detections of motion, and compile visual representation of events depicted in video images or video streams, e.g., based on and in response to a user request. For example, in some implementations, an apparatus can include a camera configured to detect, via a processor at the camera, motion and objects. The processor can be configured to execute one or more object detection models and/or capture video images and videos at a predefined rate such as, for example, 1 frame per second. The camera can include one or more sensors such as, for example, a motion detector and/or an image sensor. The motion detector can be configured to detect motion or movement of objects (e.g., people, vehicles, animals, debris, etc.). In some implementations, the motion detector can be configured to execute motion algorithms using pixel differencing to identify changes between two consecutive video/image frames of a video stream (also referred to herein collectively as "video"). The motion detector can subtract pixel values of two video/image frames and analyze the difference between the pixel values to detect motion within a scene (e.g., an area or region of analysis associated with a portion of the field of view of a camera).

In some implementations, the sensor can include an object detector (or object detection model) such as, for example, a You Only Look Once (YOLO) object detection model. The YOLO detection model can include, by way of example, a Yolox® detector. In some implementations, the object detector can be configured to detect and localize objects of various classes within an image or video in real-time in response to motion detected by the motion detector. In other words, the object detector can be triggered in response to the motion detector detecting motion. In some implementations, the object detector can include one or more object detection models that use a neural network to perform object detection and classification, optionally simultaneously or overlapping in time. As such, objects can be detected and classified faster and more efficiently than can be achieved using known object detection methods. In other words, the camera can detect objects in real-time or substantially in real-time (e.g., edge computing) away from a centralized compute device (e.g., backend). As a result, one or more embodiments of the present disclosure can reduce computational load at the centralized compute device/backend, and data can be more efficiently processed at/near the location of object detection without transmitting large volumes of data to the centralized compute device/backend for analysis, in turn reducing latency and improving motion detection speed. Cameras of the present disclosure can be deployed on/within various infrastructures or environments such as, for example, streetlights, buildings, roofs, and/or the like, to monitor traffic, pedestrian activity, and/or environmental conditions. Objects can be detected locally (e.g., at the location of the camera and/or within the environment of the camera). In addition, objects can be tracked and/or traffic of objects can be determined, in real-time or substantially in real-time. As used herein, "substantially in real-time" can refer to an event that occurs immediately following a predicate event, adjusted for processing-related delays (e.g., computation delay, transmission delay, etc.). In some implementations, object detections can be discrete across/within video/image frames, and subsequently aggregated to form an event catered to/based on a user preference or request. This aggregation can include aggregating non-duplicative detections of the object.

In some implementations, an event (also referred to herein as "object event") can refer to a sequence of video/image frames that depict a detected object of interest (e.g., object detection). For example, an event for an object can include a sequence of video/image frames in which the object enters a scene, appears in the scene, and/or leaves/exits the scene. In some cases, an event can include a sequence of video/image frames of an object while the object is in motion. For example, an object in a video stream can be stationary for an extended period of time and then begin moving, in which case an event for that object can include a sequence of video/image frames from when the object starts moving until the object stops moving or leaves the scene. In some implementations, an event can also be determined (or generated) based on one or more user preferences/criteria, such that the event (and/or the sequence of video/image frames associated therewith) satisfy a user request.

In some implementations, the camera can be configured to check each object detection against each motion detection (e.g., compare each object detection with each motion detection from a plurality of motion detections) to filter out static objects, thereby generating filtered data. In some implementations, the camera can execute a post-processing of the filtered data to confirm that objects are static or moving. For example, the post-processing can include performing a motion grid overlap check, in which the processor at the camera can use computer vision and/or motion tracking to determine if two or more objects in a video stream are overlapping or colliding with each other. The processor at the camera can divide each video frame into a grid of cells and calculate the feature vectors for each cell. In some cases, the grid of cells can have, for example, dimensions of 10×10. The feature vectors can include information describing positions of objects and/or how the positions of the objects changes over type. The information in the feature vectors can include a two-dimensional (2D) vector describing magnitude and/or direction. In some implementations, the processor at the camera can compare feature vectors for neighboring cells in the grid to determine if two or more objects are overlapping and/or intersecting with each other. Objects across video/image frames that nearly completely overlap each other can indicate that those objects are the same object. Intersecting objects across video/image frames (or to some degree of overlap) can indicate motion of a singular object.

In some implementations, after generating filtered data, the camera can execute a data migration by uploading object detections (or data about object detections) and/or motion detections (or data about motion detections) to a database that is remote from the camera (e.g., at backend or server), and retrieve the data therefrom for processing at a later time. As such, computational overhead can be reduced by processing some data at the location where the data is received instead of having a centralized compute device to process all or most of the data and store the data. In some implementations, the object detection data can include, for example, information about a location, size, shape, and/or orientation of the detected object(s), as well as information about a confidence level of the detection of objects. In some implementations, the object detection can include feature vectors (e.g., 2D vectors) describing location, size, shape, orientation, and/or the like of detected objects. In some implementations, the motion detection data can include information about a location, direction, speed, and duration of detected motion of objects as well as information about a confidence level of the detection of motion of objects. In some implementations, the motion detection data can include feature vectors (e.g., 2D vectors) describing location, direction, speed, and/or duration of detected motion of objects.

In some implementations, the apparatus can include multiple cameras configured to continuously capture video/image frames (or video streams) of different scenes and stitch, via a processor at a camera from the multiple cameras or at a centralized compute device, video/image frames from each video stream captured by each camera to detect moving objects that travel from one scene captured by one camera to a different scene captured by a different camera. In some implementations, detections of an object that appears in different scenes from different cameras can be aggregated and/or combined, at the camera, to produce a track for that object (i.e., a complete path of travel associated with that object). It is to be understood that methods and/or processes performed by the processor at the camera can likewise be performed, in whole or in part, and alternatively or in addition, by a processor at a different location than of the camera(s) (e.g., server(s), remote compute device(s), etc.) but operably coupled to/in communication with that camera. The camera can optionally process and/or track multiple moving objects from multiple scenes in parallel.

In some embodiments, the apparatus can include a compute device configured to receive motion detection data from a camera and process user requests using the object detection data and/or motion detection data. In some implementations, the compute device can be configured to generate a visual representation including video segments from video streams captured by cameras based on user preferences/requests. In some implementations, the compute device can be or can include a backend (e.g., a server) that is located remote from a set of one or more cameras configured to capture data of various scenes (e.g., object detection data, motion detection data, etc.). A processor at the compute device can be caused to execute a data migration (e.g., for video streams, video/image frames, object detections, trajectories, etc.), during which the compute device receives data from the set of one or more cameras that are remote from the compute device. In some implementations, the compute device can store any information generated by the set of one or more cameras within a data storage system (e.g., a cloud database, a local database, etc.). In some implementations, the compute device can organize the information received from the set of one or more cameras into a table or other format describing/specifying, for example, specific camera type, camera ID, timeframe of video/image frames captured by specific cameras, identifiers for specific objects, object types, time window of motion of objects, and/or the like.

In some implementations, the processor at the compute device can receive user requests from multiple users, each user request including a request for information about a specific region of interest in a scene, a specific object of interest found in a scene, a specific time window, and/or the like. It is to be understood that the compute device can receive and process hundreds of user requests near instantly (e.g., in real-time or substantially in real-time). The processor at the compute device can query a database to retrieve events to be used when generating a visual representation (e.g., a preview image sequence, discussed further below) to be presented to a user and that satisfies the user request. Information can thus be processed and presented efficiently and in a desired (e.g., tailored, excerpted, reduced size, etc.) format instead of a presenting a list of long video streams (or the long video streams themselves) to users for interpretation/sorting themselves. In other words, the compute device can highlight specific objects of interest, and/or an image sequence of video/image frames relevant to the user preferences/request such that the users need not locate/navigate to the information themselves.

In some implementations, the processor at a compute device can query a database, based on and in response to the user request, to retrieve events satisfying the user request. For example, if the user request specifies a request for information about a specific person (i.e., a condition of the request is an indication of the person), the compute device can retrieve events (e.g., sequences of video/image frames (e.g., about 20 seconds in duration)) in which that person is depicted. In some implementations, the events retrieved can include an event in which a predetermined threshold number of detections is exceeded, in which that person appears in a sequence of video/image frames of an event. In other words, if an event includes detections of the person for 30 percent of an event duration, that event may be retrieved in response to the user request. In some implementations, if the user request specifies a region of interest of a specific scene, the processor can retrieve events in which the region of interest of the scene includes detections of one or more objects. The processor can retrieve events in which moving objects have been detected within the region of interest, and combine/aggregate those events. In some implementations, if the user request includes a specific timeframe or time window, the processor at the compute device can retrieve events that include sequences of video/image frames that include the timeframe or time window, overlap with the timeframe or time window, and/or are close to the timeframe or time window (to a certain degree and/or within a predetermined amount of time before or after). The processor at the compute device can combine retrieved events to produce an aggregated event that satisfies the user request.

In some implementations, the processor at the compute device can aggregate events associated with an object to produce the aggregated event. In some implementations, the processor can aggregate video/image frames of objects of events retrieved in response to the query within a predetermined interval such as, for example, 20 seconds, to produce the aggregated event for the object and that includes a sequence of video/image frames equivalent to 20 seconds. As such, latency may be reduced and the continued generation of events can be performed. Events can be generated automatically by the processor. In some implementations, the aggregated event can include multiple events for an object can be that are stitched to generate a single event for the object by the processor, which can possesses greater computing power than a processor of a camera. In some implementations, the processor can combine events of objects based on a degree of crowding of the objects. For example, events of objects that are close to each other and/or overlap in appearances (e.g., for one or more specified time windows or timeframes) in a scene can be combined into a single event and/or to produce the aggregated event. As such computational overhead may be reduced when processing events for objects that share features.

In some implementations, a processor at the compute device can be configured to select a thumbnail image time and/or a thumbnail image, based on a user request and using a ranking algorithm. For example, the processor can select a timeframe from an aggregated event that best matches/satisfies the user request and select a thumbnail image time based on the timeframe. If the user request specifies a timeframe of interest, thumbnail image times within that timeframe can be ranked higher than timeframes not within that timeframe. Alternatively or additionally, if the user request specifies a time window of interest, a timeframe closer to the middle of the time window of interest can be ranked higher than timeframes further from the middle of the time window of interest, in which case the thumbnail image time can be selected from within the timeframe closest to the middle of the time window. Alternatively or additionally, if the user request specifies a region of interest, timeframes associated with larger numbers of objects appearing within the region of interest can be ranked higher than timeframes associated with lower numbers of objects appearing within the region of interest, in which case the timeframe associated with the highest number of objects can be selected as the basis for selecting the thumbnail image time. Alternatively or additionally, if the user request specifies an object of interest, timeframes associated with the object of interest appearing closer to the center of a scene can be ranked higher than timeframes associated with the object of interest located further from the center of the scene, in which case the timeframe associated with the object of interest closest to the center of the scene can be selected as the basis for selecting the thumbnail image time. In some implementations, the processor can retrieve a video segment (e.g., stored in the database) and process the video segment (e.g., decryption, decoding, caching, etc.) to extract a video frame aligned with the selected thumbnail image time. In some implementations, the processor can generate a preview image clip (e.g., a preview image sequence) that includes the thumbnail image and a video segment associated with the aggregated event.

In some embodiments, an apparatus can include a compute device (e.g., frontend) configured to receive a preview image clip generated by a backend. In some implementations, the compute device can be operated by a user sending user requests. In some implementations, the compute device can include a graphical user interface (GUI) in which a visualization of the preview image clip is displayed to be viewed by the user. In some implementations, the visualization can include multiple preview image clips based on the user request and organized in a grid of thumbnail images that match the user request. In some implementations, each thumbnail image in the grid can include a timeframe (e.g., thumbnail image time) that indicates the specific moment and/or time of when a video frame (e.g., thumbnail image or thumbnail) in the thumbnail image was captured.

In some implementations, when a user hovers a cursor over and/or clicks a thumbnail image on the GUI, the thumbnail image can be expanded to display additional information about the preview image clip. The additional information can include a preview image clip associated with the thumbnail image and when in the preview image clip the thumbnail image is extracted from. The preview image clip can include a progress bar of a video stream of the preview image clip and can be set at the time of the thumbnail image. In some implementations, the additional information can also include extracted images (e.g., cropped images, zoomed images, etc.) of objects found in the preview image clip. As such, a user may readily ascertain a clearer image of one or more objects that appear in the scene (or display area).

In some embodiments, an apparatus can receive and process user requests to produce search results with reduced errors as contrasted with known techniques. The apparatus can be configured to cause the search results to be presented to a requesting user using one or more thumbnail images, for example, to consolidate the search results and/or to provide a concise visual representation of information satisfying user requests. Such visual representations can include contextual information and/or one or more hyperzooms or "hyperzoom images" (e.g., enlarged views of objects detected in events). The search results can be formatted in a way that is easily archivable and/or shareable by users.

In some embodiments, an apparatus can be configured minimize bandwidth usage when transferring data, by storing metadata at a backend while running object detection and/or motion detection at a processor of a camera (e.g., using edge computing). In some implementations, the apparatus does not store thumbnail information (e.g., thumbnail images, thumbnail image times, etc.) at the backend and stores thumbnail information at the cameras without using a backend transcoding server.

FIG. 1 is a block diagram illustrating a system 100 for detection-based object search, according to some embodiments. As shown in FIG. 1, the system 100 includes one or more sensor(s) 120, one or more server(s), a user compute device 110, and a compute device 101, each connected to and operably coupled with one another via a network 140. Although four devices are depicted in FIG. 1, it should be understood that system 100 can include any other number of sensors and/or user compute devices not shown in FIG. 1.

In some implementations, the network 140 can be any type of network (e.g., a local area network (LAN), a wide area network (WAN), a virtual network, a telecommunications network) implemented as a wired network and/or wireless network and used to operatively couple the sensor(s) 120, the user compute device 110, the server(s) 130 and/or the compute device 101. In some implementations, the user compute device 110, the server(s) 130, and/or the compute device 101 can be connected to each other via an Internet Service Provider (ISP) and the Internet (e.g., the network 140). In some embodiments, a connection can be defined, via the network 140, between any two compute devices. In some embodiments, the compute devices (e.g., sensor(s) 120, user compute device 110, server(s) 130, compute device 101, etc.) can communicate with each other (e.g., send data to and/or receive data from) and with the network 140 via intermediate networks and/or alternate networks (not shown in FIG. 1). Such intermediate networks and/or alternate networks can be of a same type and/or a different type of network as the network 140.

In some implementations, the network 140 can include, for example, a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 140 can be a wireless network such as, for example, a Wi-Fi or wireless local area network ("WLAN"), a wireless wide area network ("WWAN"), and/or a cellular network. In some instances, the network 140 can be a wired network such as, for example, an Ethernet network, a digital subscription line ("DSL") network, a broadband network, and/or a fiber-optic network. In some instances, the compute device 101 and can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 140 can be encrypted or unencrypted. In some instances, the network 140 can include multiple networks or subnetworks operatively coupled to one another by, for example, network bridges, routers, switches, gateways and/or the like.

In some embodiments, the sensor(s) 120 can be or include a camera and/or multiple cameras with multiple sensors. The sensor(s) 120 can be configured to capture information about an environment or a scene from an angle or point of view. The sensor(s) 120 can be configured to capture videos (also referred to herein as "video streams") including video/image frames of a scene. The sensor(s) 120 can include, for example, active sensors and/or passive sensors. In some implementations, the sensor(s) 120 can include active sensors such as, for example, radar, lidar, ultrasonic sensors, infrared sensors, and/or the like. The active sensors can be configured to emit signals to detect objects and measure their distances, speeds, directions, and/or the like. In some implementations, the sensor(s) 120 can operate in dark environments. The sensor(s) 120 can include passive sensors such as, for example, optical cameras, thermal cameras, microphone, and/or the like. The passive sensors can be configured to detect changes such as temperature, pressure, windspeed, and/or the like in an environment or scene. In some cases, the sensor(s) 120 can be configured to capture objects in an indoor environment and that emit their own signals (e.g., acoustic object detection). In some implementations, the sensor(s) 120 can include multiple sensors in a sensor suite. In some cases, the sensor(s) 120 can include multiple sensors located remote from each other and configured to capture video streams at different angles, point of views, and/or the like. In some implementations, the sensor(s) 120 can be described further in detail in FIG. 5.

In some implementations, the sensor(s) 120 can include a motion detector such as, for example, a passive infrared (PIR) motion detector, a microwave motion detect, an ultrasonic motion detector, a video motion detector, an internal measurement unit (IMU), and/or the like. In some implementations, the sensor(s) 120 can include an object detector (or object detection model) such as, for example, a YOLO object detection model. The YOLO object detection model can include a Yolox® detector. In some implementations, the object detector can be configured to detect and localize objects of various classes within an image or video in real-time. In some implementations, the object detector can include object detection models that use a neural network to perform object detection and classification simultaneously. As such, objects may be detected and classified faster and more efficiently than is achievable using known object detection methods. In other words, the camera can detect objects in real-time (e.g., edge computing) away from a centralized compute device (e.g., backend). As a result, computational load at the centralized compute device/backend can be reduced, and data can be more efficiently processed at/near the location of object detection without transmitting large volumes of data to the centralized compute device/backend for analysis, in turn reducing latency and improving motion detection speed. The camera can be deployed on/within various environments or infrastructures such as, for example, streetlights, buildings, roofs, and/or the like, to monitor traffic, pedestrian activity, and/or environmental conditions. Objects can be detected locally (e.g., at the location of the camera and/or within the environment of the camera). In addition, objects can be tracked and/or traffic of objects can be determined, in real-time or substantially in real-time. As used herein, "substantially in real-time" can refer to an event that occurs immediately following a predicate event, adjusted for processing-related delays (e.g., computation delay, transmission delay, etc.).

In some implementations, the sensor(s) 120 can detect motion using pixel differencing. Pixel differencing can include identifying changes between two consecutive video/image frames of an image or video by subtracting the pixel values of the two consecutive video/image frames and analyzing the difference(s), to detect motion. In some implementations, the two video/image frames can first be converted to grayscale, and then the pixel values of the second video frame can be subtracted from the pixel values of the first video frame. The resulting difference image can depict the changes between the two video/image frames, with regions of motion appearing as areas of higher pixel differences.

In some embodiments, the server(s) 130 can include component(s) that are remotely located from the sensor(s) 120, the user compute device 110, and/or the compute device 101. In some implementations, the server(s) 130 can include one or more servers located at various locations and configured to provide centralized services and/or store data over the network 140. In some implementations, the server(s) 130 can include, for example, file servers, web servers, application servers, database servers, mail servers, print servers, and game servers, and/or the like. In some implementations, the server(s) 130 can store motion detection data 131 and object detection data 133. In some implementations, the motion detection data 131 can be captured at a rate of between about 0.5 frames per second and about 3 frames per second. In some implementations, the motion detection data 131 includes a set of video segments, each of which includes a duration of between about 10 seconds and about 30 seconds. The motion detection data 131 can include information about movement or motion of objects in a scene, as recorded by the sensor(s) 120. In some implementations, the motion detection data 131 can include, for example, the position, velocity, or acceleration of objects. In some implementations, the motion detection data 131 can also include information about the movement of objects such as, for example, people, vehicles, or other moving objects of interest. In some implementations, the motion detection data 131 can include information about a location, direction, speed, and duration of detected motion of objects as well as information about a confidence level of the detection of motion of objects. In some implementations, the motion detection data 131 can include feature vectors (e.g., 2D vectors describing location, direction, speed, and duration of detected motion of objects. In some implementations, the object detection data 133 can include, for example, information about a location, size, shape, and/or orientation of the detected objects, as well as information about a confidence level of the detection of objects. In some implementations, the object detection data 133 can include feature vectors (e.g., 2D vectors) describing location, size, shape, orientation, and/or the like of detected objects The user compute device 110 can include a compute device configured to be operated by a user and/or to transmit a user request 113 (or multiple user requests) to the compute device 101 via the network 140. The user request 113 can include a request for retrieval of video stream(s) and/or motion detection data 131 specific to at least one condition specified in the user request 113. The user request 113 can include a representation of at least one of a geographic region of interest, a time period of interest, an object of interest, and/or the like. The user compute device 110 can also include a graphical user interface (GUI) 115 that the user can interact with, e.g., to the transmit the user request 113 to the compute device 101 and/or to receive and view results that were generated based on the user request 113.

The compute device 101 can be configured to process the user request 113 and identify one or more event(s) 103 based on the motion detection data 131 and/or based on the object detection data 133, and based on the user request 113, to generate one or more preview image clip(s) 105 (e.g., including one or more preview image sequences). In some implementations, the event(s) 103 (also referred to herein as "object events") can refer to a sequence of video/image frames that depict a detected object of interest. For example, the event(s) 103 for an object of interest can include a sequence of video/image frames in which that object enters a scene, appears in the scene, and/or leaves/exits the scene. In some cases, the event(s) 103 can include a sequence of video/image frames depicting an object when the object is in motion. For example, an object in a video stream can be stationary for an extended period of time and begin moving, in which case the event(s) 103 for that object can include a sequence of video/image frames covering the time period from when the object starts moving until the object stops moving or leaves the scene. In some implementations, the event(s) 103 can also be identified/selected based on one or more user preferences.

Figure 2:
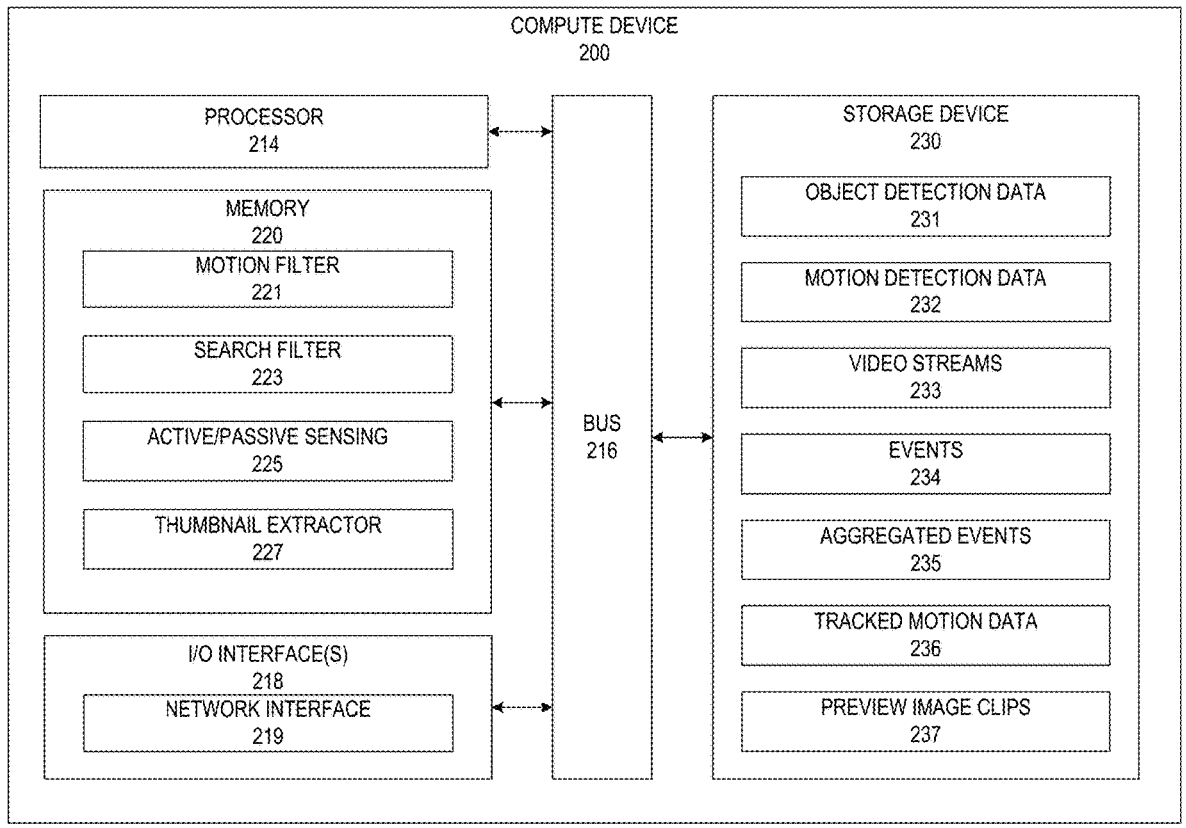
FIG. 2 is a block diagram illustrating a compute device for detection-based object search, according to some embodiments.

FIG. 2 is a block diagram illustrating a compute device 200 for detection-based object search, according to some embodiments. The compute device 200 can include similar components and/or be structurally similar to, for example, the compute device 101 of FIG. 1. As shown in FIG. 2, the compute device 200 includes a processor 214, a memory 220, I/O interface(s) 218, and a storage device 230, all of which can communicate with each other via a bus 216. The compute device 200 can be or include, for example, a computer workstation, a terminal computer, a server computer, a handheld device (e.g., a tablet computer, a smartphone, etc.), and/or any machine capable of executing a sequence of instructions that specify an action to be taken by the compute device 200. The compute device 200 can also include multiple compute devices that can be used to implement a specially configured set of instructions for causing one or more of the compute devices to perform any one or more of the aspects and/or methodologies described herein.

The I/O interface(s) 218 of the compute device 200 can include a network interface 219. The network interface 219 can be used to connect the compute device 219 to one or more of a variety of networks and one or more remote devices connected thereto. In other words, the compute device 200 can communicate with other devices via a network (not shown in FIG. 2). I/O interface(s) 218 can be any suitable component(s) that enable communication between internal components of the compute device 200 and external devices, such as, for example, a user compute device and/or sensor(s). The network interface 219 can be configured to provide a wireless and/or wired connection to a network.

The storage device 230 can store information generated by the processor 214 and/or received at the processor 214. In some implementations, the storage device 230 can include, for example, hard disk drives (HDDs), solid-state drives (SSDs), USB flash drives, memory cards, optical discs such as CDs and DVDs, and/or the like. In some implementations, the storage device 230 can include a database (e.g., cloud database, local database, etc.) that can be different from the memory 220. For example, the memory 220 can be volatile, meaning that its contents can lost when the compute device 200 is turned off. The storage device 230 can be configured to be persistent, meaning that its contents can be retained even when the compute device 220 is turned off. In some implementations, the storage device 230 can be configured to organize and manage large amounts of data, whereas the memory 220 can be configured to be used for temporary storage of data and program instructions. In some implementations, the storage device 230 can be configured to provide efficient and reliable storage and retrieval of data and can include features such as, for example, indexing, querying, and transaction management, while the memory 220 can be configured for rapid access and manipulation of data.

The storage device 230 can be configured to store one or more of: object detection data 231, motion detection data 232, video streams 233, video streams 233, events 234, aggregated events 235, tracked motion data 236, preview image clips 237, and/or the like. The object detection data 231 can include, for example, information about a location, size, shape, and/or orientation of the detected objects, as well as information about a confidence level of the detection of objects. In some implementations, the object detection 231 133 can include feature vectors (e.g., 2D vectors) describing location, size, shape, orientation, and/or the like of detected objects. The motion detection data 232 can include any information describing motion of an object and/or information describing an object (whether moving or not). In some implementations, the motion detection data 232 can include feature vectors describing positions of objects and/or how the positions of the objects changes over type. The information in the feature vectors can include a two-dimensional (2D) vector describing magnitude and/or direction of an object. In some implementations, the motion detection data 232 can be captured at a rate of between about 0.5 frames per second and about 3 frames per second (e.g., about 1 frame per second). In some implementations, the motion detection data 232 includes a set of video segments, each of which includes a duration of between about 10 seconds and about 30 seconds.

The video streams 233 can include data representing any sequence of video/image frames and/or sequence of video/image frames recorded by a sensor(s). In some implementations, the video streams 233 can include video streams captured by multiple sensors. In some implementations, the video streams 233 can include sequences of video/image frames captured at predetermined intervals. For example, the video streams 233 can include cropped sequences of video/image frames captured/compiled every 6 hours within a full day. In some implementations, the video streams 233 can be captured by the sensor(s) at a predetermined rate such as, for example, about 10 frames per second. In some implementations, object detections can be detected at about 1 frame per second from the video streams 233.

The events 234 can include a sequence of video/image frames that depict a detected object of interest. For example, the events 234 for an object can include a sequence of video/image frames of an object appearing in the scene and leaving the scene. In some cases, the events 234 can include a sequence of video/image frames of an object when the object is in motion. The events 234 can be generated at a camera and/or away from the compute device 200. In some implementations, the events 234 can include multiple events combined into a single event, e.g., based on crowing information. For example, objects detected to be moving in close proximity to one another, or in a crowd, can be designated as a single event.

In some implementations, the events 234 can include aggregated video/image frames of objects captured at predetermined time intervals such as, for example, about 20 seconds. By limiting the frequency of video/image capture, latency may be reduced. Events 234 can be generated automatically.

In some implementations, the events 234 can be generated based on, or can include, an aggregation of object detections that satisfies the user request (e.g., depicting a specific object of interest, a specific region of interest, etc.). In some cases, some events 234 can overlap with one other or may be similar to one another. As such, overlapping events can be combined to a single event, or one may be discarded/deleted from memory, to reduce computational overhead, save storage space, and/or reduce redundant and/or duplicate events. For example, images depicting two people moving the same direction, velocity, and/or vicinity may originally be determined to be/represent two events. If both people appear and/or leave a scene at the same time and/or share similar features (e.g., motion vector, speed, location, etc.), the processor 214 may combine the two images into a single event, and each person may be distinguished/identifiable by their own bounding box and/or features.

In some implementations, the aggregated events 235 can include events retrieved from the events 234 and aggregated to match/satisfy a user request. In some implementations, the processor 214 at the compute device 200 can query a database (e.g., storage device 230), in response to the user request, to retrieve events satisfying the user request. For example, if the user request specifies an individual person of interest, the compute device can retrieve events depicting that person (e.g., sequences of video/image frames (optionally about 20 seconds in duration) that depict that person), which in turn may be aggregated to produce the aggregated events 235. In some implementations, the events retrieved can include an event in which a predetermined threshold number of detections of the person of interest appears within a sequence of video/image frames of an event. In some implementations, if the user request includes at a region of interest of a specific scene, the processor 214 can retrieve events in which the region of interest of the scene includes detections of objects. For example, the region of interest can include a portion of the scene. The processor 214 can retrieve events in which moving objects that have been detected in the region of interest and combine those events. In some implementations, if the user request includes a specific timeframe or time window, the processor 214 at the compute device 200 can retrieve events that include sequences of video/image frames that include the timeframe or time window, overlap with the timeframe or time window, and/or are close to the timeframe or time window (to a certain degree and/or predetermined threshold). The processor 214 can combine retrieved events to produce an aggregated event to be used to satisfy the user request.

The tracked motion data 236 can include tracking information about one or more moving objects. In some cases, the tracked motion detection data 236 can be generated and/or based on object detection data 231 and/or motion detection data 232. In some implementations, the tracked motion data 236 can include bounding box data. For example, the bounding box data can include descriptions of bounding boxes (e.g., coordinates, dimensions, etc.) that are associated with moving objects. The bounding boxes can be or include rectangles that can be overlayed over objects found in the video streams 233 or video/image frames of the video streams 233. The bounding boxes can be used to represent the location and size of objects. In some cases, the bounding boxes can be defined by their top-left corner coordinates, width, and height. In some implementations, bounding boxes can be generated using a variety of object detection algorithms, such as, for example, region proposal networks, sliding window approaches, and/or the like. In some implementations, the bounding boxes can be refined and adjusted based on post-processing techniques such as, for example, non-maximum suppression or bounding box regression. In some instances, the tracked motion data 236 can include information about movement, orientation, and/or location of bounding boxes associated with moving objects. For example, the tracked motion data 236 can include information about movement of a bounding box across video/image frames. The tracked motion data 236 can include a path that a bounding box traverses based on a location of the bounding box relative to a location of a bounding box in a previous video/frame for the same moving object.

In some implementations, a bounding box can be overlayed on an object in each video frame of a video stream and be assigned a score via a ranking algorithm, based on at least one bounding box area overlap with the geographic region of interest, and/or at least one of a degree of centrality of the object of interest within a display area, a location of the object of interest, a duration associated with the at least one event, or a number of objects of interest depicted within the video frame. In some cases, the score of a bounding box (or object) in a video frame can be based on the information about that bounding box (or object) in previous video/image frames. For example, an object that stays at the same location and/or position as that same object in a previous video frame (or previous video/image frames) can be assigned the same score based on no change to feature vector for that object, indicating no motion, which can be interpreted by the processor 214 to be stationary. In some cases, objects that move either horizontally across the same plane or a perpendicular frame (i.e., moving closer or further from the camera) can have changing scores based on changing feature vectors for that object, which can indicate that that object is moving. In some instances, the processor 214 can determine if an object is behind another object and maintain the bounding box for that object until it reappears in a different video frame. Bounding boxes (or objects) that are covered by another object based on the position of the sensor(s) can be assigned a lower score. In some cases, objects that are stationary can be assigned a lower score than objects that are moving.

The preview image clips 237 can include sequences of video/image frames associated with thumbnail images and/or thumbnail times. The thumbnail times (also referred to herein "thumbnail image times") can include time or timeframes of specific moments or video/image frames within video streams 233 that is selected to represent a preview image clip. The thumbnail times can be selected by the processor 214 to best visualize user request. The thumbnail times can be selected automatically The thumbnail images can include specific video/image frames at the thumbnail times. In some implementations, the thumbnail images can include information that best matches user request. For example, the thumbnail images can include a thumbnail image of a person of interest at the center of the thumbnail image. Consequently, the person of interest, as indicated by a user request, may be visually easy to identify/locate within a display. In some implementations, thumbnail information (e.g., thumbnail times, thumbnail images, etc.) can be stored away from the compute device 200 and/or at the camera.

A preview image clip can include a video segment from the video streams 233 that best match a user request. In some cases, the preview image clip can include a progress bar of a video stream of the preview image clip and can be set at the time of the thumbnail image. In some implementations, the additional information can also include extracted images (e.g., cropped images, zoomed images, etc.) of objects found in the preview image clip. As such, a user may readily ascertain a clearer image of one or more objects that appear in the scene (or display area).

The processor 214 can be or include, for example, a hardware based integrated circuit (IC), or any other suitable processing device configured to run and/or execute a set of instructions or code. For example, the processor 214 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 214 can be configured to run any of the methods and/or portions of methods discussed herein.

The memory 220 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 214 to perform one or more processes, functions, and/or the like. In some implementations, the memory 220 can include extendable storage units that can be added and used incrementally. In some implementations, the memory 220 can be a portable memory (e.g., a flash drive, a portable hard disk, and/or the like) that can be operatively coupled to the processor 214. In some instances, the memory 220 can be remotely operatively coupled with a compute device (not shown); for example, a remote database device can serve as a memory and be operatively coupled to the compute device. The memory 220 can include various components (e.g., machine-readable media) including, but not limited to, a random-access memory component, a read only component, and any combinations thereof. In some cases, a basic input/output system (BIOS), including basic routines that help to transfer information between components within the compute device 200, such as during start-up, can be stored in memory 220. The memory 220 can further include any number of program modules including, for example, an operating system, one or more application programs, other program modules, program data, and any combinations thereof.

The memory 220 can stores instructions that can cause processor 214 to execute modules, processes, programs, devices, and/or functions such as, for example, motion filter 221, search filter 223, active/passive sensing 225, thumbnail extractor 227, and/or the like. The motion filter 221, search filter 223, active/passive sensing 225, and/or the thumbnail extractor 227 can be implemented as one or more programs and/or applications that are tied to hardware components (e.g., a sensor, an I/O device, a processor, etc.). In some implementations, the memory 220 can also store programs and/or applications associated with an operating system (e.g., power management, memory allocation, etc.).

In some embodiments, active sensing 222 can include active sensing or scanning of an environment, as described herein. In some embodiments, active sensing 222 can include active scanning of an environment or scene and/or sensing or perceiving information associated with the environment, object(s) within the environment (e.g., humans, vehicles, bicycles, trees, etc.).

In some implementations, the motion filter 221 can be executed by the processor 214 to filter out static objects in a video stream and/or video/image frames based on motion detection. In some cases, the motion filter 221 can be caused to analyzes a video stream or sequence of images (e.g., video/image frames) and identify objects that exhibit little to no motion over time. In some implementations, the motion filter 221 can be caused to compute differences between successive video/image frames and thresholding a resulting image to highlight regions of motion. In some implementations, objects that remain stationary for a predetermined period of time, such as, for example, parked cars, trees and/or the like, can appear as static regions and/or static objects which can be filtered out by setting some predetermined threshold. Alternatively or additionally, and in some implementations, other filters based on color, texture, or shape analysis can also be used to identify and exclude static objects.

In some implementations, the motion filter 221 can receive a video stream (or video/image frames) from a sensor(s) (e.g., a camera) that is configured to detection motion and identify multiple objects in a scene and determine moving objects and static objects based on location of objects (e.g., pixel locations) across multiple video/image frames for the objects. In other words, objects detected that do not change in location can be determined to be stationary and/or static objects (e.g., idle people, parked cars, trees, etc.). The motion filter 221 can extract static objects from moving objects. In some implementations, the processor 214 can be caused to execute a post-process of the filtered data to confirm that objects are static or moving. For example, the post-process can include a motion grid overlap check in which the processor 214 can determine if two or more objects in a video streams are overlapping or colliding with each other. The processor 214 can divide each video frame into a grid of cells and then calculate the feature vectors for each cell. The feature vectors can include information describing positions of objects and/or how the positions of the objects changes over type. The information in the feature vectors can include a 2D vector describing magnitude and/or direction. In some implementations, the processor 214 can compare feature vectors for neighboring cells in the grid to determine if two or more objects are overlapping and/or intersecting with each other. Objects across video/image frames that nearly completely overlap each other can indicate that those objects are the same object. Intersecting objects across video/image frames (or to some degree of overlap) can indicate motion of a singular object.

The search filter 223 can be executed by the processor 214 to customize search results based on user requests. The user requests can include a request of information about a specific region of interest in a scene, specific object of interest found in a scene, specific time window, and/or the like. In other words, the search filter 223 can process data stored in a database (e.g., storage device 230) to present to a user a visualization of information compliant with the user request. Information can thus be processed and presented efficiently and in a desired (e.g., tailored, excerpted, reduced size, etc.) format instead of a presenting a list of long video streams (or the long video streams themselves) to users for interpretation/sorting themselves. In other words, the search filter 223 can be used in generating a visualization that highlights specific objects of interests, events of specific objects of interests, and/or an image sequence of video/image frames relevant to the user preferences such that the users do not have to find those specific information themselves. In some cases, if the user request(s) includes at least one condition for information about a specific person, the search filter 223 can retrieve events 234 of that person. In some implementations, the search filter 223 can includes a range of parameters that users can adjust, such as, for example, an object of interest(s), region(s) of interest, time window(s) of interest, and/or the like, such that the search filter 223 can generate search results that match the user request.

The thumbnail extractor 227 can be executed by the processor 214 to extract a thumbnail image from the search results processed by the search filter 223. In some implementations, the thumbnail extractor 227 can be configured to select and/or identify a thumbnail image and/or a thumbnail image time based on a positioning of a detected object within a display area of filtered motion data associated with the detected object. In some implementations, the processor 214 and/or the thumbnail extractor 227 can be configured to interpolate stored bounding box data associated with the thumbnail image time to identify a bounding box of interest (e.g., the bounding box for the detected object). Interpolation can include estimating location of an object as described by a bounding box of the object (e.g., bounding box data) at a specific point in time (e.g., thumbnail image time). In some cases, the compute device can interpolate the stored bounding box data to fill in missing or incomplete data to generate a more accurate and/or precise location, and/or speed of an object. For example, if an object is detected at video frame 1 and video frame 10, but not at video/image frames 2-9, the compute device can estimate the position and/or speed at those missing video/image frames based on bounding box data (e.g., observed movement and speed of the object) in the video/image frames where it was detected.

In some implementations, the thumbnail extractor 227 can extract a video frame associated with a bounding box of interest (e.g., thumbnail or thumbnail image). In some implementations, the processor 214 and/or the thumbnail extractor 227 can be configured to use the bounding box of interest to generate a preview image clip that includes a video stream segment associated with the thumbnail image time. In other words, the processor 214 can align the thumbnail image time with a video stream segment saved in a database and process the video stream segment (e.g., decryption, decoding, etc.) to extract the thumbnail image.

Figure 3:
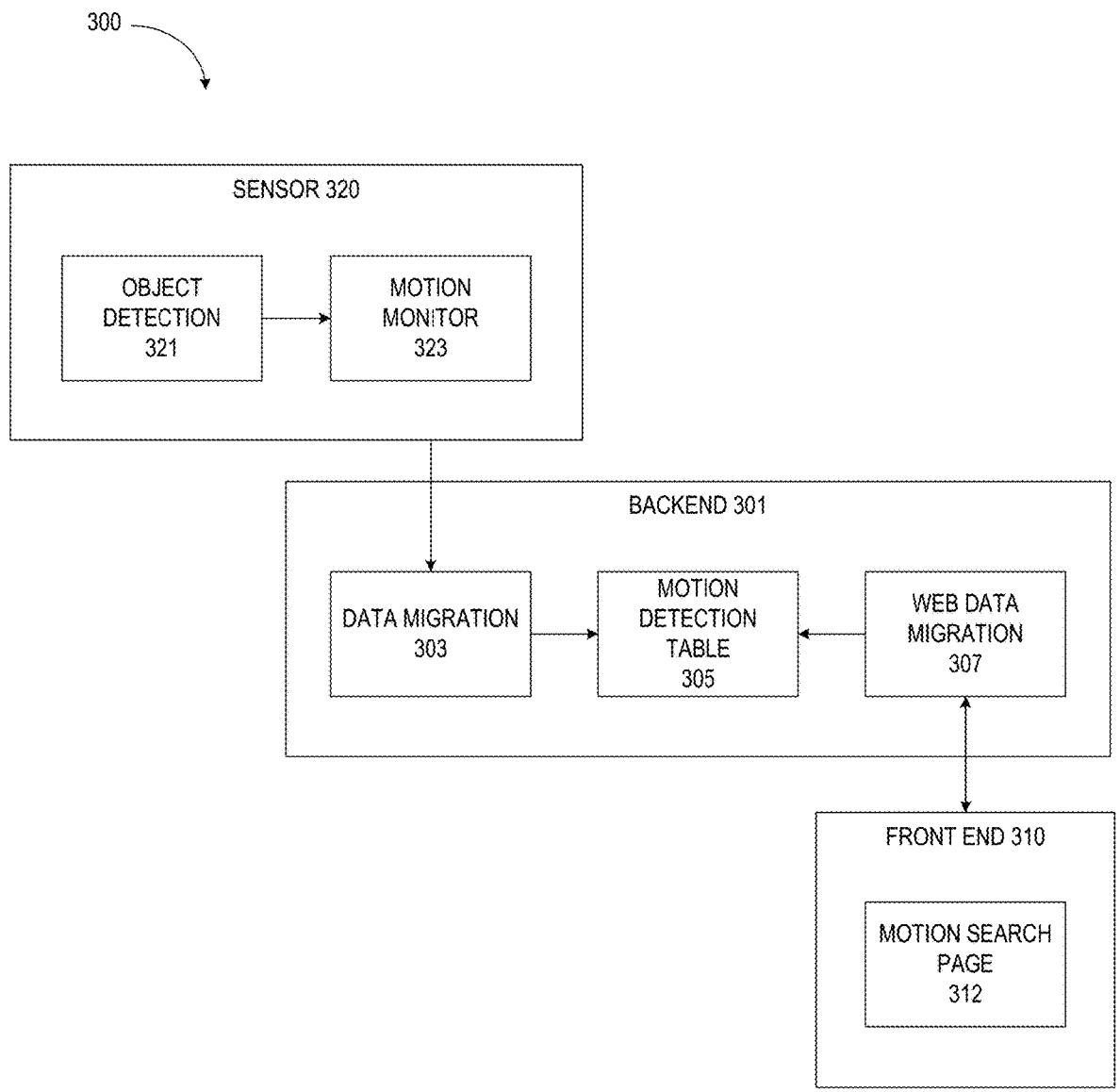
FIG. 3 is a schematic diagram of a system for detection-based object search, according to some embodiments.

FIG. 3 is a schematic diagram of a system 300 for detection-based object search, according to some embodiments. The system 300 can include a sensor 320, a backend 301, and a front end 310. The sensor 320 can be consistent with the sensor(s) 120 of FIG. 1. In some implementations, the backend 301 can be consistent with the compute device 101 of FIG. 1 and/or the compute device 200 of FIG. 2. In some implementations, the front end 310 can be consistent with the user compute device 110 of FIG. 1.

The sensor 320 in the system 300 can include modules, processes, programs, devices, and/or functions such as, for example, object detection 321 and motion monitor 323. The object detection can include detecting objects and/or extracting tracking information of objects. The motion monitor 323 can including aggregating detections from the object detection 321 and/or filtering out static objects. The sensor 320 can be or include a camera (e.g., a video camera).

In some implementations, the sensor 320 can perform edge computing to process and/or analyze data of objects such that the data can be processed at the sensor 320 instead of at a centralized location (e.g., backend 301). Moving objects may thus be efficiently identified, moving objects may be efficiently tracked, and/or data associated with moving objects may be efficiently generated, in real-time or substantially in real-time, without the need to transmit large amounts of data to the centralized location (e.g., backend 301) for analysis. As such, latency may be reduced and/or motion detection may be faster. The sensor 320 can be deployed on various infrastructures such as, for example, streetlights, buildings, roofs, and/or the like, to monitor traffic, pedestrian activity, and/or environmental conditions. Objects can be detected locally (e.g., at location of the camera and/or environment) to track objects, determine traffic of objects, and/or the like in real-time or substantially in real-time.

The front end 310 can include a motion search page 312 which can be generated by the backend 301 and presented on a GUI of the front end 310. A user can interact with the motion search page 312 via the GUI to customize user requests for the backend 301 to receive via the web data migration 307. The backend 301 can include modules, processes, programs, devices, and/or functions such as, for example, data migration 303, motion detection table 305, and/or a web data migration 307. The data migration 303 can be executed to retrieve data from the motion monitor 323. The motion detection table 305 can include a table that stores data from the motion monitor 323 and/or the sensor 323 in response to receiving data via the data migrater 303. The web data migration 307 can be executed via the front end 310 to store search results in the motion detection table 305.

Figure 4:
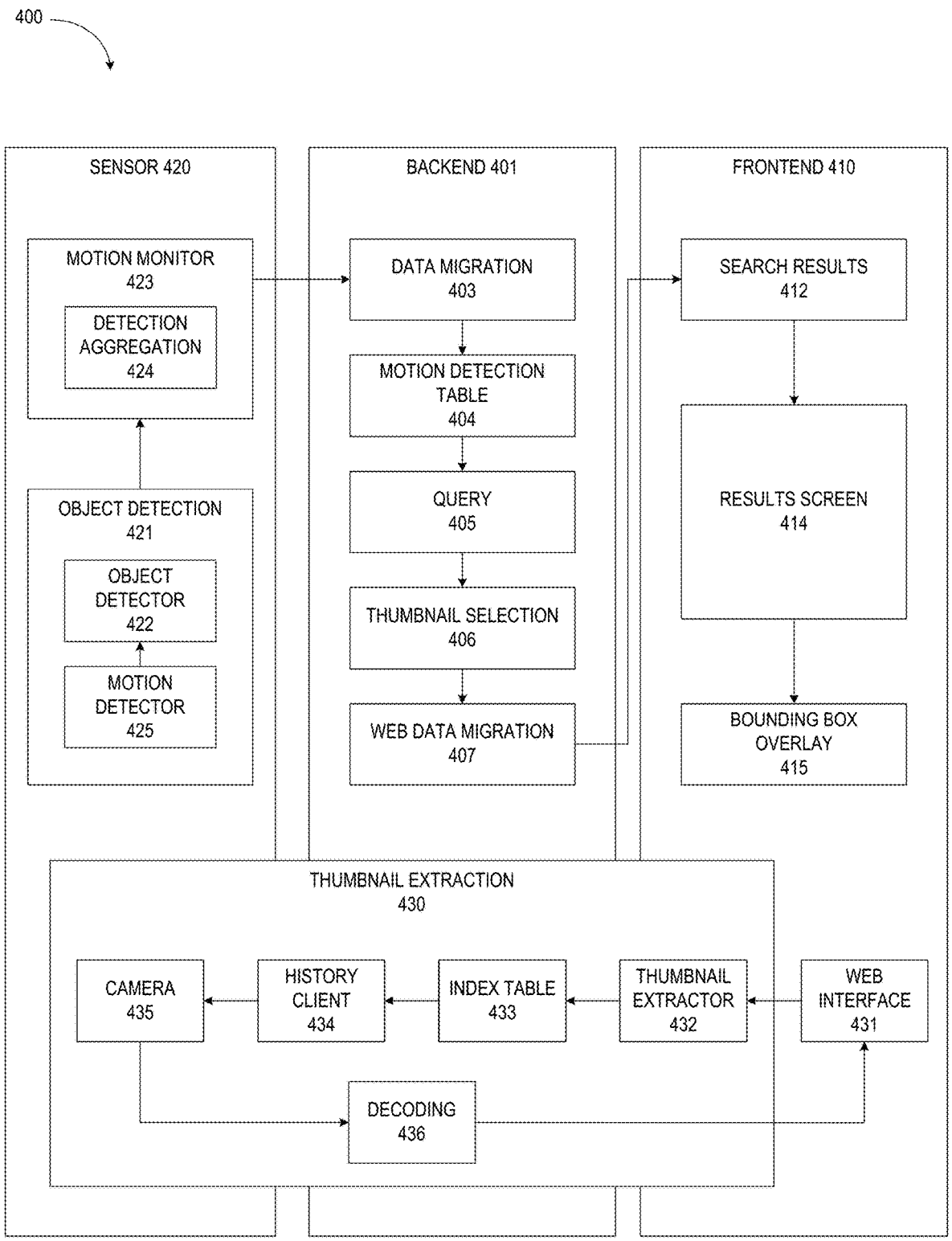
FIG. 4 is a schematic diagram of a system for detection-based object search including a thumbnail extractor, according to some embodiments.

FIG. 4 is a schematic diagram of a system 400 for detection-based object search including a thumbnail extractor 430, according to some embodiments. The system 400 can include a sensor 420, a backend 401, a frontend 410, and/or a thumbnail extractor component 430. The sensor 420, the backend 401, and the frontend 410 can be consistent with the sensor 320, the backend 301, and the frontend 310 of FIG. 3, respectively. The thumbnail extractor 432 can be consistent with the thumbnail extractor 227 of FIG. 2.

The sensor 420 can include modules, processes, programs, devices, and/or functions such as object detection 421 and motion monitor 423. The object detection 421 and the motion monitor 423 can be consistent with the object detection 321 and the motion monitor 323 of FIG. 3, respectively. In some implementations, the sensor 420 can include, at the object detection 421, a motion monitor 425 and an object detector 422. In some implementations, the sensor 420 can include, at the motion monitor 432, detection aggregation 424. The sensor 420 can be described further in detail in FIG. 5

The backend 401 can include modules, processes, programs, devices, and/or functions such as, for example, data migration 403, motion detention table 404, query 405, thumbnail selection 406, and/or web data migration 407. The data migration 403, motion detection table 404, and the web data migration 407 can be consistent with the data migration 303, the event track table 305, and the web data migration 307 of FIG. 3. The backend 401 can be described further in detail in FIG. 6.

The front end 410 can include modules, processes, programs, devices, and/or functions such as, for example, search results 412, a results screen 414, a bounding box overlay 415, and a web interface 431. The search results 412 can be consistent with any search results as described herein. The frontend 410 can be described further in detail in FIG. 7.

The thumbnail extraction component 430 can be implemented in hardware and/or software, and can include modules, processes, programs, devices, and/or functions such as, for example, a camera 435, a history client 434, index table 433, thumbnail extractor 432, and/or decoding 436. The thumbnail extraction 430 component can be described further in detail in FIG. 8.

Figure 5:
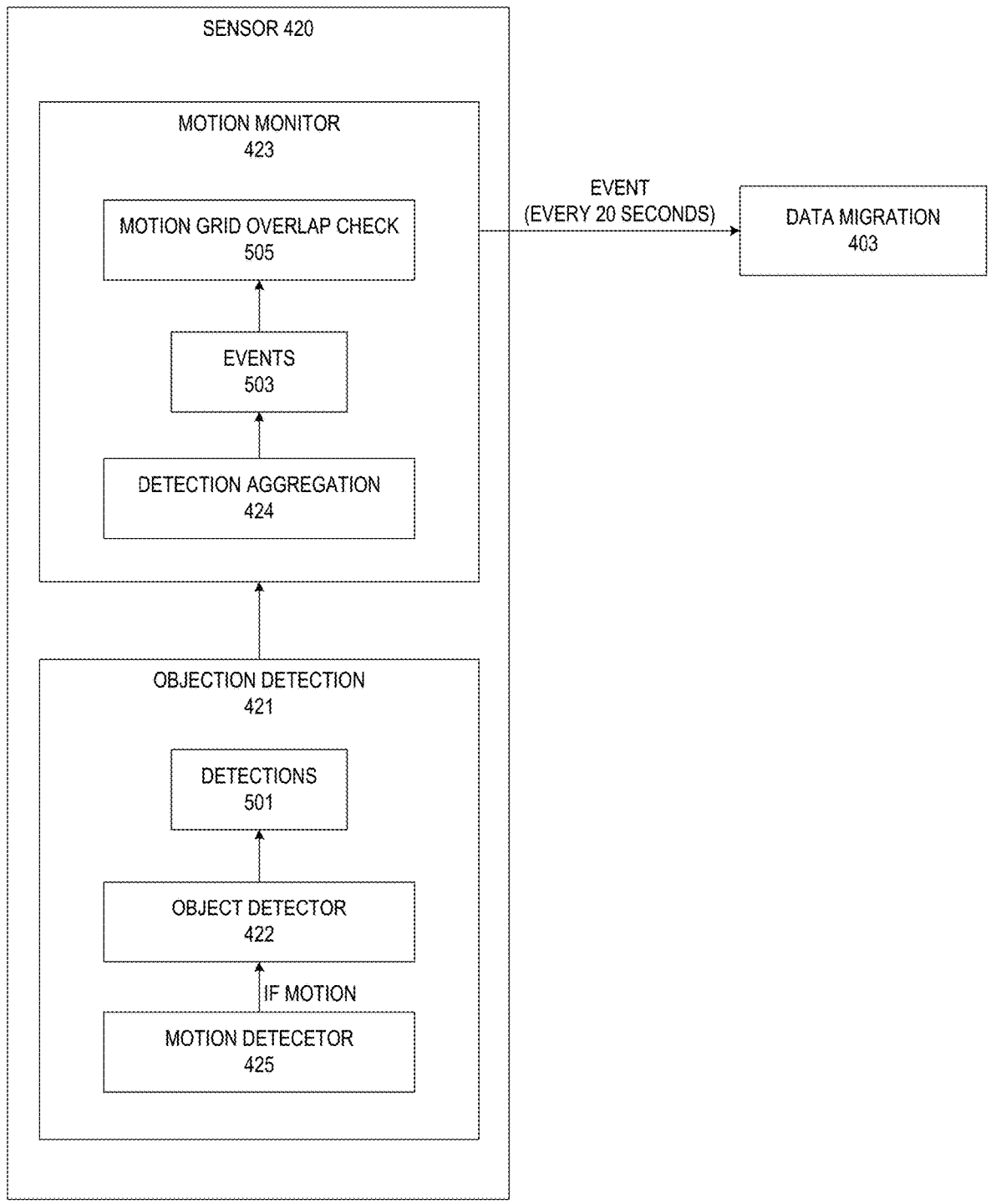
FIG. 5 is a process diagram for an example sensor of the system shown in FIG. 4.

FIG. 5 is a process diagram for an example sensor of FIG. 4, according to some embodiments. The sensor 420 can include modules, processes, programs, devices, and/or functions such as object detection 421 and motion monitor 423. At the object detection 421, a motion detector 425 can be configured to detect motion using any methods described herein. At the objection detection 421, an object detector 422 can be triggered based on motion detected by the motion detector 425. The object detector 422 can be configured to generate object detections 501 and/or detect objects.

At the motion monitor 423, the object detections 501 can be used in detection aggregation 424 to generate events 503. Objects detected and associated with the events 503 can be confirmed whether the objects detected are static or moving at a motion grid overlap check 505. The sensor 420 can be configured to trigger a data migration to send data to a backend.

Figure 6:
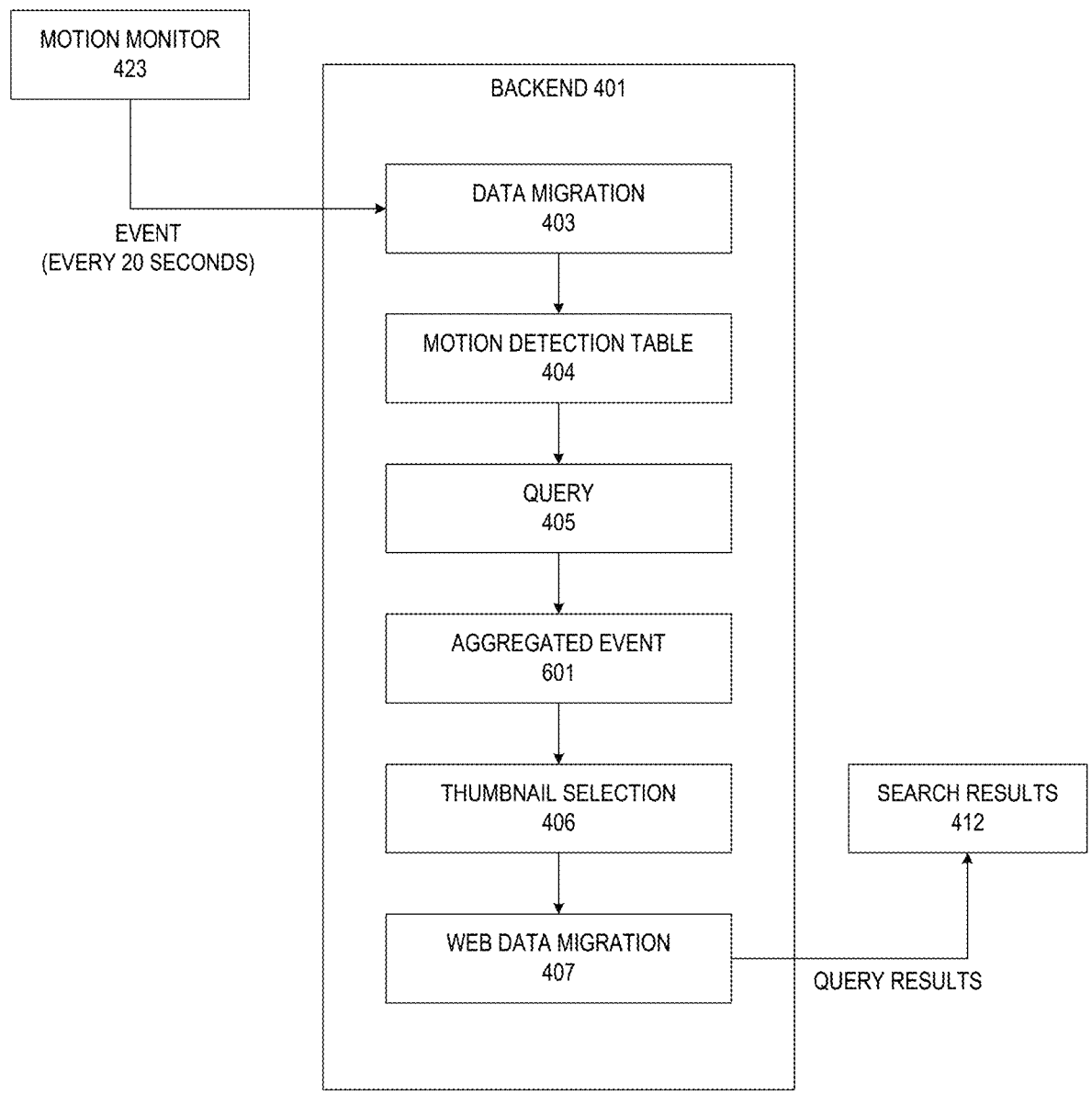
FIG. 6 is a process diagram for an example backend of the system shown in FIG. 4.

FIG. 6 is a process diagram for an example backend of FIG. 4, according to some embodiments. The backend 401 can include modules, processes, programs, devices, and/or functions such as, for example, data migration 403, motion detention table 404, query 405, aggregated even 406, and/or web data migration 407. At the data migration 403, the backend 401 can receive data (e.g., object detections, events, motion detection data, object detection data, etc.) from a sensor. At the motion detection table 404, data received via the data migration 403 can be stored. The motion detection table 404 can be further described in FIG. 7

At the query 405, the backend 401 can process a user request and query a database to retrieve events associated with the user request. The query 405 can include filtering based on conditions of the user request (e.g., region of interest, object of interest, etc.). The events can be aggregated to produce the aggregated event 601 to consolidate the events to satisfy the user request. In some implementations, the aggregated event 601 event can include a combination of events that include a representation of the object detections specified by the user request. In some cases, the aggregated event 601 can include a combination of events associated with the user request and that share features (e.g., overlap in timeframe or time window, located close to each other, etc.). In some implementations, a processor at the backend can aggregated events associated with an object to produce the aggregated event 601. In some implementations, the processor can aggregate video/image frames of objects of events retrieved form the query within a predetermined interval such as, for example, 20 seconds, to produce the aggregated event for the object and that includes a sequence of video/image frames equivalent to 20 seconds. As such, latency may be reduced and the continued generation of events can be performed. Events can be generated automatically by the processor. In some implementations, the aggregated event can include multiple events for an object can be that are stitched to generate a single event for the object by the processor, which can possesses greater computing power than a processor of a camera. In some implementations, the processor can combine events of objects based on a degree of crowding of the objects. For example, events of objects that are close to each other and/or overlap in appearances (e.g., time windows or timeframes) in a scene can be combined to a single event and/or to produce the aggregated event 601. As such computational overhead may be reduced when processing events for objects that share features. The aggregated event 601 can be used in thumbnail selection 406 and based on the user request. At the thumbnail selection 406, a thumbnail can be selected to be part of a search result(s) for the user request. At the web data migration 407, the search result can be sent to a frontend (e.g., GUI of a user compute device).

Figure 7:
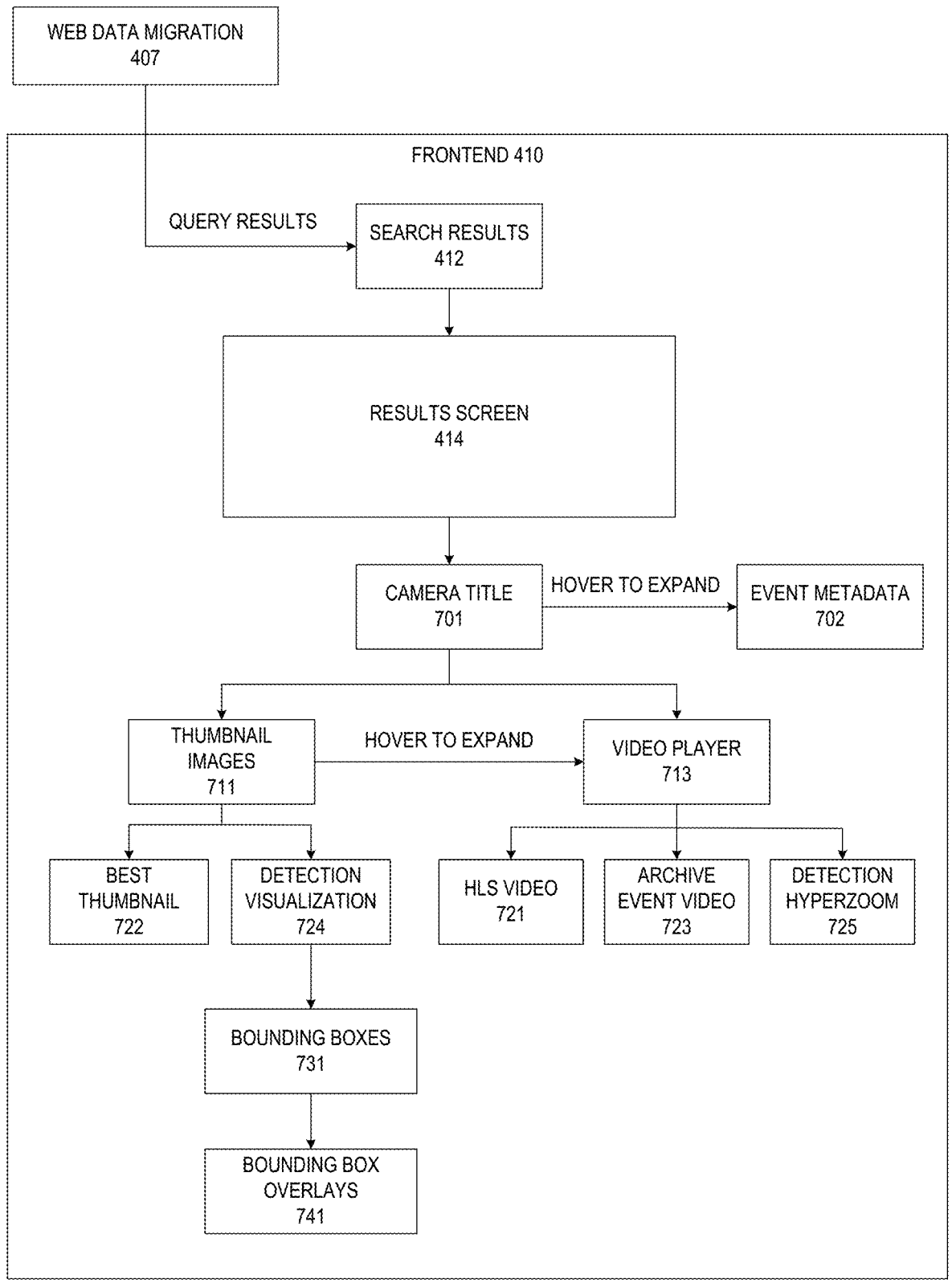
FIG. 7 is a process diagram for an example frontend of the system shown in FIG. 4.

FIG. 7 is a process diagram for an example frontend of FIG. 4, according to some embodiments. In some implementations, the processes of the frontend 410 can be performed at a backend of the compute device in which the frontend 410 presents to a user operating the frontend 410 results of the processes. At the frontend 410, search results 412 can be received from the backend. The search results 412 can be presented in a results screen 414 that can include a grid or grid layout of thumbnail images 711 that match the user request on a GUI. The results screen 414 can be presented on the GUI operated by a user to view a visualization of the search results 412.

The results screen 414 can include a camera title 701. The camera title 701 can be an identifier for a sensor used to capture the thumbnail images 711 in the results screen 414. The camera title 701 can also include information such as, for example, event metadata 702. The event metadata 702 can include additional information associated with an event associated with detected object resulting from a user request, such as, for example, location, size, shape, and/or the like.

The results screen 414 can include multiple thumbnail images 711, which, when a user hovers over a thumbnail image from the multiple thumbnail images 711 with a user interface (e.g., a cursor), the thumbnail image expands to execute a video player 713. The video player 713 include a video segment. In some cases, the thumbnail images can include a "best"/preferred thumbnail 722, which can be a video/image frame for a video segment that the user views on the results screen 414 presented on the GUI. The thumbnail images 711 can also include a detection visualization 724, which can include bounding boxes 731 (and/or bounding box overlays 741). The video player 713 can include an HTTP LiveStreaming (HLS®) video 721, an archive event video 723, and/or a detection hyperzoom 725. The HLS® video 721 can include a streaming protocol to play the archive event video 723. The archive event video 723 can include at least a portion of a video stream associated for a thumbnail image. The detection hyperzoom 724 can include close-up images of objects captured in the archive event video 723.

Figure 8:
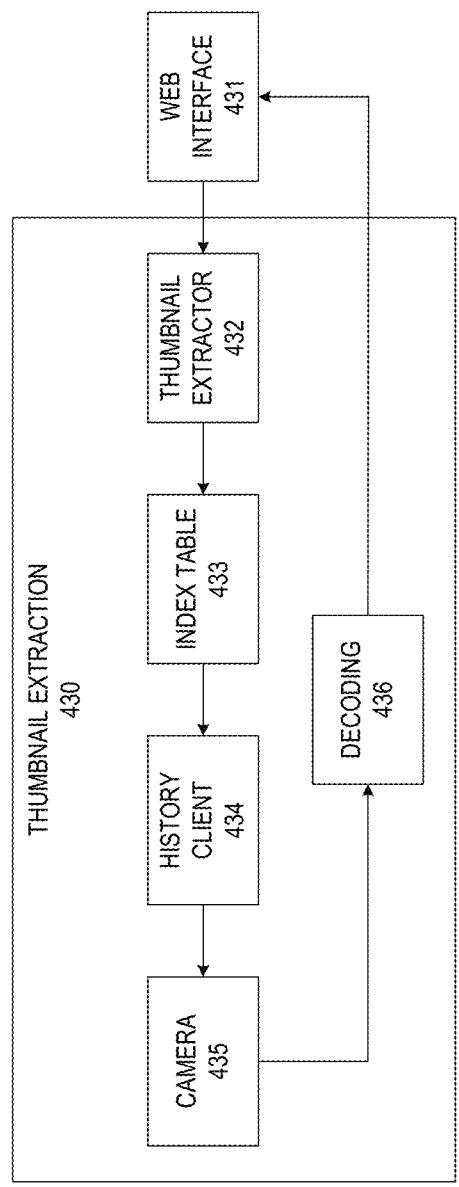
FIG. 8 is process diagram for a thumbnail extractor, according to some embodiments.

FIG. 8 is process diagram for a thumbnail extractor, according to some embodiments. The thumbnail extractor includes a thumbnail extraction component 430, according to some embodiments. The thumbnail extraction component 430 as shown in FIG. 8 can include modules, processes, programs, devices, and/or functions such as, for example, a thumbnail extractor 432, an index table 433, history client 434, a camera 435, decoding 436, and/or the like.

At the thumbnail extraction component 430, the thumbnail extractor 432 can be executed in response to a user request received via a web interface 431 (e.g., with which a user may interact). The thumbnail extractor 432 can be executed to query the index table 433 to cause the history client 434 to extract and/or request data relevant to the user request and captured and/or recorded by the camera 435. At the decoding 436, the data can be decoded, decrypted, cropped, and/or cached, and subsequently used in generating search results, visual representations of which may be presented to the user. In some implementations, a backend of the compute device can send a signal to the thumbnail extractor 432 via the web interface 431 to retrieve data for generating search results to satisfy the user request. In some implementations, the data that is decoded, decrypted, cropped, and/or cached can be used to select thumbnail images for presentation to the user as part of the search results.

Figure 9:
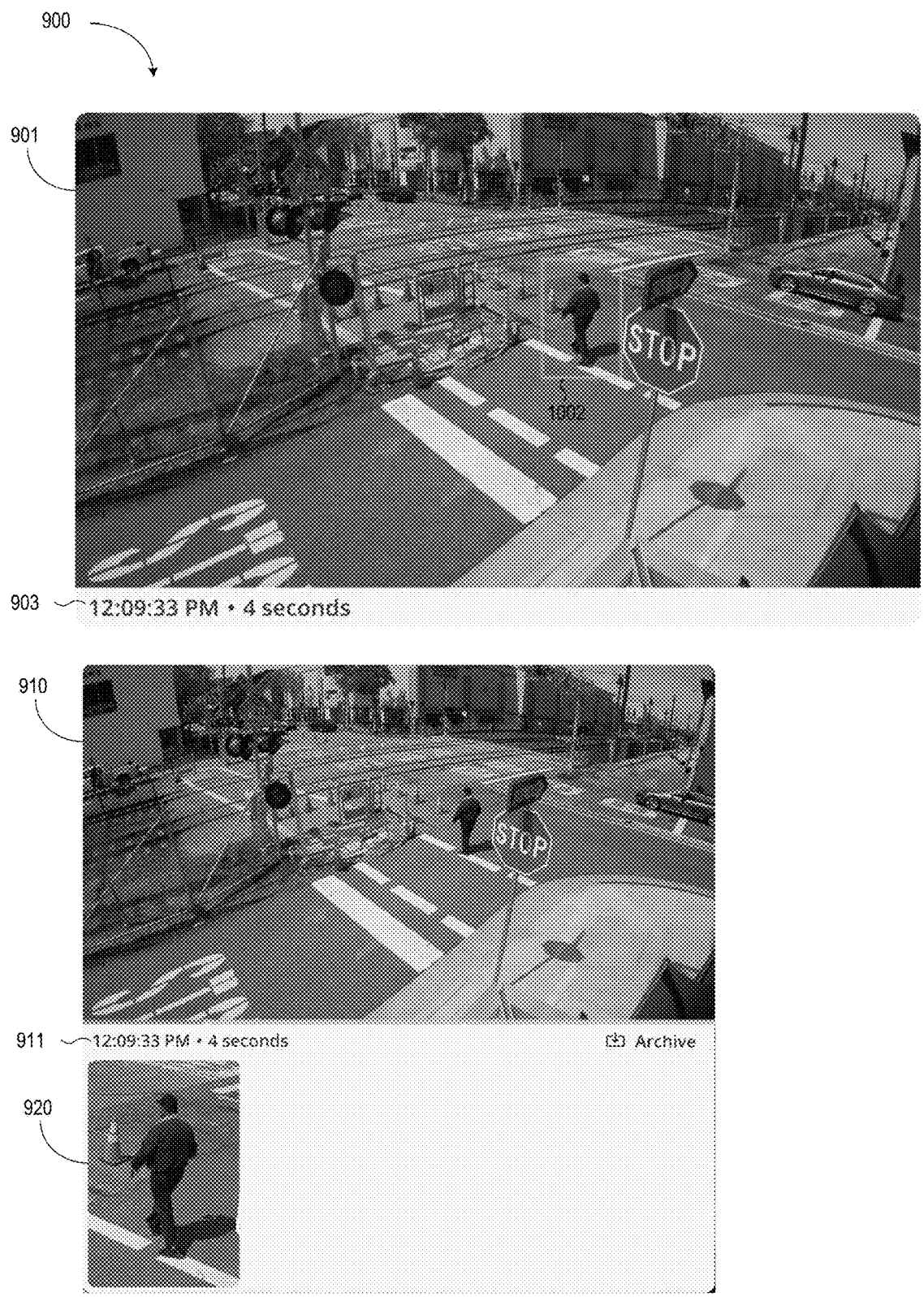
FIG. 9 shows an example thumbnail image with overlays, according to some embodiments.

FIG. 9 shows an example thumbnail image 900 with overlays, according to some embodiments. In some implementations, the representation 900 can be a representation of a search result based on a user request. For example, the representation 900 can include one event from multiple events of the search result. The representation 900 can include a thumbnail image 901, a preview image clip 910, and an object image 920.

As shown in FIG. 9, the thumbnail image 901 can include a video frame from a video segment. In some implementations, the thumbnail image 901 can include video/image frame associated with a thumbnail time 903. The thumbnail image time 903 can include a time or timeframe of a specific moment or video frame within the video segment that is selected to represent the preview image clip 910. In other words, the thumbnail image 901 can be the video frame at the thumbnail image time 903. In some implementations, the thumbnail image 901 can be a video frame from the video segment and/or the preview image clip 910 that displays the most information (or information that best satisfies the user request). The thumbnail image 901 can be the first image that the user views. For example, if the user request includes a person of interest, the thumbnail image 901 can include a video frame from video segments that include the person of interest in which the person of interest is located at the center of the video frame. As such, the person of interest may be readily identifiable to the user when the user views the results responsive to the user request via a GUI of the user's compute device. The thumbnail image time 903 can be selected to best visualize the user request.

As shown in FIG. 9, the thumbnail image 900 can include an object of interest that is overlayed by a bounding box 902 that identifies the object of interest. The bounding box 902 (or bounding box overlay) can be used as a tracker of the object of interest. The preview image clip 910 can include sequence of video/image frames associated with/including the thumbnail image 901 and/or thumbnail image time 903. The preview image clip 910 can include a video segment from a video stream captured by a sensor. In some implementations, the preview image clip 910 can include a progress bar 911 of a video segment of the preview image clip 910 and can be set at the time of the thumbnail image.

In some implementations, when a user hovers a cursor over and/or clicks the thumbnail image 901 displayed on a GUI, the thumbnail image 901 can be expanded to display additional information about the preview image clip 910. The additional information can include the object image 920 of the object of interest which can include a cropped image of the object of interest. In some instances, the object image 920 can include a zoomed and/or cropped image that includes the object of interest. In some cases, the additional information can include multiple cropped images of any detections of objects captured in a display area of the video segment. A user may therefore readily (e.g., quickly) locate/view a clearer image of objects that appear in the scene (or display area).

Figure 10:
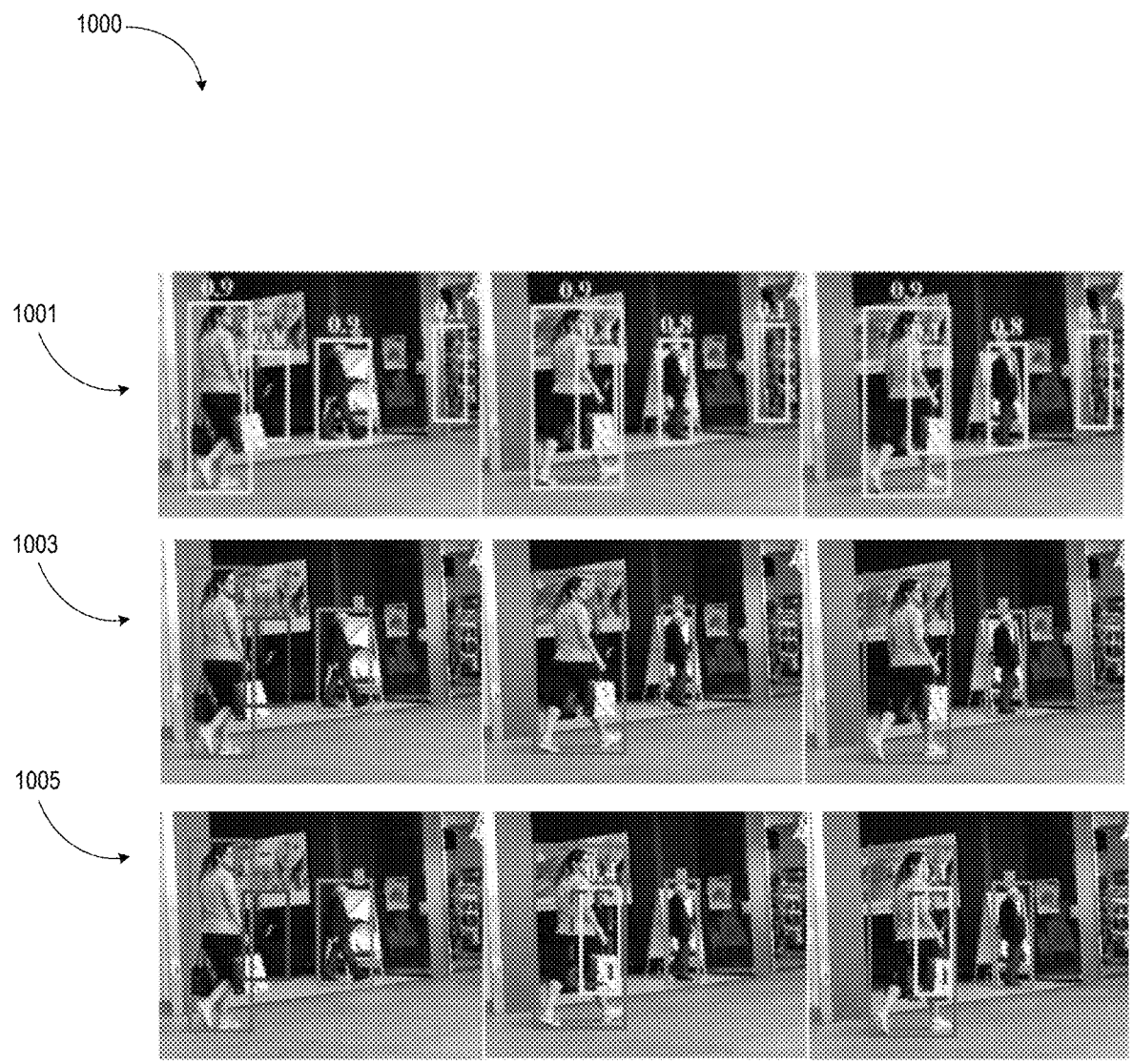
FIG. 10 is an illustrative representation of bounding boxes around objects based on scores, according to some embodiments.

FIG. 10 is an illustrative representation 1000 of bounding boxes around objects based on scores, according to some embodiments. At 1001, a sequence of video/image frames includes images of a scene captured by a camera in a chronological order. At 1001, a compute device can detect objects (e.g., people) and generate bounding boxes to be overlayed over those objects. Each bounding box and/or object can be scored based on a degree of significance of that object with respect to its location in a display are of the video/image frame.

In some cases, the score of a bounding box (or object) in a video/image frame can be based on the information about that bounding box (or object) and/or information in previous video/image frames. For example, an object that stays at the same location and/or position as that same object in a previous video/image frame (or previous video/image frames) can be assigned the same score based on no change to feature vector for that object, indicating no motion, which can be interpreted by the processor at the camera to be stationary. In some cases, objects that move either horizontally across the same plane or a perpendicular frame (i.e., moving closer or further from the camera) can have changing scores based on changing feature vectors for that object, which can indicate that that object is moving. In some instances, the compute device can determine if an object is behind another object and maintain the bounding box for that object until it reappears in a different video/image frame. Bounding boxes (or objects) that are covered by another object based on the position of a camera can be assigned a lower score. In some cases, objects that are stationary can be assigned a lower score than objects that are moving.

At 1003, the sequence of video/image frames can include bounding box overlays over certain objects (via some filter) such as, for example, people. Each person and/or bounding box overlay of each person can be a different color to distinguish each person from each other. At 1005, the compute device can determine, based on previous video/image frames, whether an object exists behind another object. For example, a moving object located closer to the camera can obfuscate other objects. The compute device can maintain a bounding box overlay of objects that get obfuscated to track that object.

Figure 11:
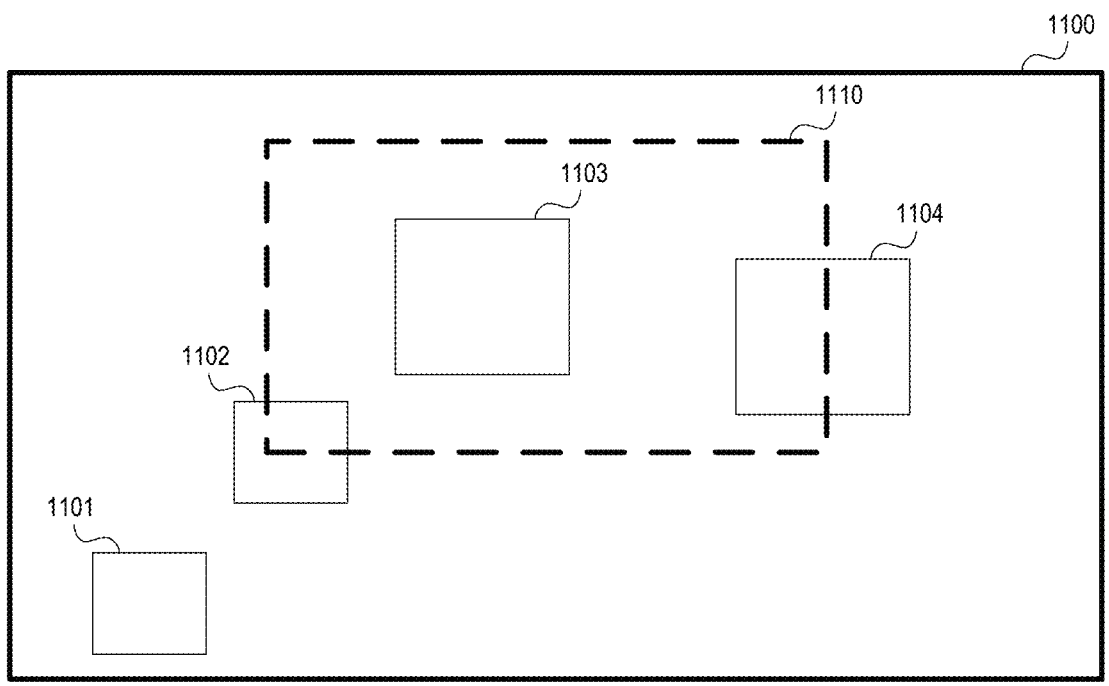
FIG. 11 is a diagrammatic illustration of thumbnail selection based on a user's region of interest, according to some embodiments.

FIG. 11 is a diagrammatic illustration of thumbnail selection based on a user's region of interest, according to some embodiments. As shown in FIG. 11, a display area 1100 can include a dimension of video streams and/or sequences of video/image frames that a camera captures (based on the hardware of the camera). In some cases, the display area 1100 can have the same dimensions as a video/image frame. A user can select a region of interest 1110 as part of a user request in which a compute device can process the request and retrieve detections of objects found within the region of interest 1110. As shown in FIG. 11, the region of interest 1110 is represented as dashed lines to indicate a user-selected region.

In some implementations, the display area 1100 can include multiple detections 1101, 1102, 1103, 1104. Based on the region of interest 1110, the compute device can retrieve detections of objects in the region of interest 1100 such as detection 1103, detection 1102, and/or detection 1104.

Figure 12:
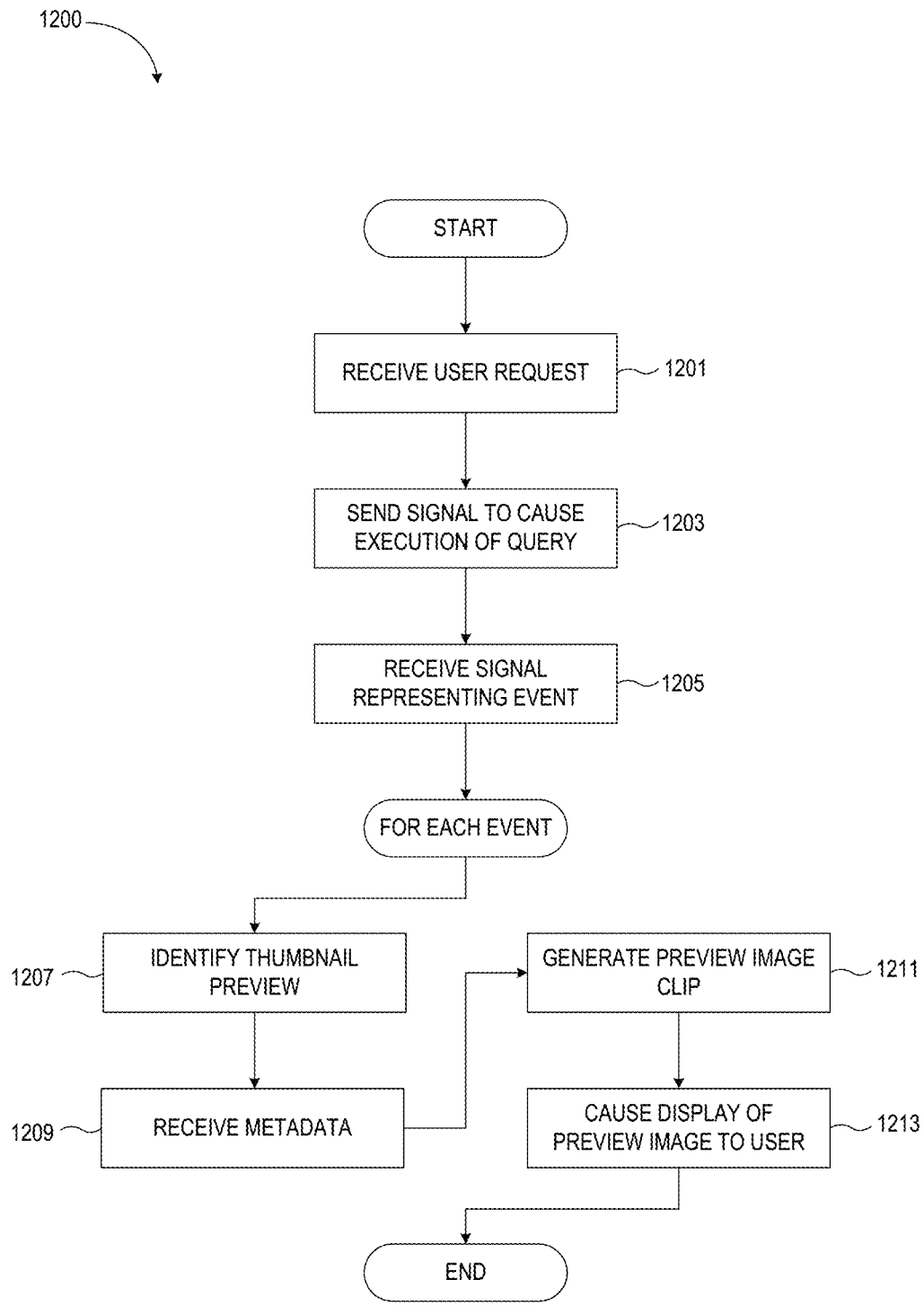
FIG. 12 is a flow diagram of a computer-implemented method for processing user requests by a compute device and based on detections, according to some embodiments

FIG. 12 is a flow diagram of a method 1200 of a computer-implemented method for processing user requests by a compute device and based on detections, according to some embodiments. In some implementations, the method 1200 can be performed by at processor at the compute device (e.g., a backend). In some cases, the processor can be configured to perform the method 1200 automatically.

At 1201, the method 1200 includes receiving, at the processor, a user request indicating at least one of a region of interest associated with a display area, a timeframe of interest, or an object of interest. The user request can be consistent with any user request as described herein. For example, the region of interest can include a portion of the display area. In other words, the display area can be a scene that a camera records videos or video/image frames of, and the region of interest can include a portion of the scene that a user is interested in. In some instances, the timeframe of interest can include a specific time in the video of the display area recorded by the camera, a time window (e.g., a duration within a particular window of time) that the user is interested in. In some instances, the object of interest can be a specific object that the user is interested in. In some implementations, the processor can receive multiple user requests in parallel from different users.

At 1203, the method 1200 includes sending, via the processor, a signal to cause execution of a query to identify object detections based on the user request. In some implementations, the query can include a query of a database that stores data received by the processor such as, for example, motion detection data, object detection data, tracked motion data, events, and/or the like. In some implementations, the data received can be already processed by the camera such that videos or video/image frames captured by the camera do not need to be processed at the processor of the compute device (e.g., a centralized location). The object detections can be used to retrieve events associated with the object detections.

At 1205, the method 1200 includes receiving, at the processor, a signal representing at least one event identified in response to the query. The event can be consistent with any event as described herein. In some instances, if the user request includes at least one condition for information about an object of interest, the processor can retrieve events of that object of interest (e.g., sequence of video/image frames (20 seconds) that include that person). In some implementations, the events retrieved can include an event in which a predetermined threshold of detections of that person appears in a sequence of video/image frames of an event. In some implementations, if the user request includes at a region of interest of a specific scene or display area, the processor can retrieve events in which the region of interest of the scene or display area includes detections of objects. The processor can retrieve events in which moving objects that have been detected in the region of interest and combine those events. In some implementations, if the user request includes a specific timeframe or time window, the processor at the compute device can retrieve events that include sequences of video/image frames that include the timeframe or time window, overlap with the timeframe or time window, and/or are close to the timeframe or time window (to a certain degree and/or predetermined threshold).

In some implementations, the event received via the processor can include an aggregation of multiple events. For instance, prior to receiving the signal representing the event at 1205, the processor can retrieve one or more events, based on the user request, that include one or more object detections. As described herein, an event can be a representation of an object detection for a moving object. The representation can be or include a sequence of video/image frames including the moving object and/or contain tracked motion data (e.g., bounding boxes, motion detection data, object detection data, etc.) to indicate movement of the moving object. In some cases, a scene can include multiple events (e.g., multiple object detections of moving objects) within a time window (or multiple timeframes). The processor can combine each event describing an object detection into a single event (e.g., aggregated event). The aggregated event can serve to consolidate multiple events (or object detections) for computationally efficient tracking. In some cases, the aggregated event can include a larger bounding box that can be overlayed around the one or more events retrieved. Computational overhead can be reduced when processing events for objects that share features.

In some implementations, the processor can aggregate multiple events retrieved based on a degree of overlap of time windows and/or timeframe. For example, in a video, two or more events depicting detections of moving objects that share "screen time" or are captured in minimum number (or predetermined threshold) of video/image frames can be determined by the processor to be combined (or aggregated) to generate an aggregated event. Alternatively or additionally, and in some implementations, based on an average number (or predetermined number) of events (or representations of object detections) in non-overlapping time windows across video/image frames, the processor can combine a similar number of events, based on the average number of events, to generate a single event (e.g., aggregated event).

In some implementations, the query based on the user request can result in a retrieval of multiple events (e.g., aggregated event). For each event from at least one event (e.g., aggregated event), at 1207, the method 1200 includes identifying a thumbnail preview based on the user request and using a ranking algorithm. The thumbnail preview can include a video thumbnail (or thumbnail image) and a video/image frame. In some cases, the processor can select a timeframe from the aggregated event that best matches the user request to be a thumbnail image time. For example, if the user request includes a timeframe of interest, that timeframe can be ranked the highest and be selected as the thumbnail image time while timeframes further from the timeframe of interest are ranked lower. If the user request includes a time window of interest, a timeframe closer to the middle of the time window can be ranked higher than timeframes further from the middle of the time window, in which the timeframe closest to the middle of the time window can be selected to be the thumbnail image time. If the user request includes a region of interest, timeframes associated with more objects inside the region of interest can be ranked higher than timeframes associated with less objects inside the region of interest, in which the timeframe associated with the highest number of objects can be selected to be the thumbnail image time. If the user request includes an object of interest, timeframes associated with the object of interest located closer to the center of a scene can be ranked higher than timeframes associated with the object of interest located further from the center of the scene, in which the timeframe associated with the object of interest closest to the center of the scene can be selected to be the thumbnail image time. In some instances, the processor can align the thumbnail image time with a video frame that matches the thumbnail image time. In other words, the processor retrieves the video frame captured at the timeframe selected to be the thumbnail image time. In some cases, In some instances, to align with the thumbnail image time, the processor can retrieve a video segment stored in the database and process the video segment (e.g., decryption, decoding, caching, etc.) to extract a video frame aligned with the selected thumbnail image time. In some implementations, the processor can generate a preview image clip that includes the thumbnail preview and a video segment associated with the event (or aggregated event). In some implementations, the user request can include two or more objects of interest including the object of interest, and for each event from the at least one event (e.g., an aggregated event), the associated video frame includes a depiction/representation (e.g., an image) of at least one object of interest from the two or more objects of interest.

For each event from at least one event (e.g., aggregated event), at 1309, the method 1300 includes retrieving a video segment associated with the thumbnail preview. The video segment can be at least a portion of a video stream captured by the camera. For example, the video segment can include a cropped time window of the video stream that includes information that is relevant to the user request. The video segment can include a sequence of video/image frames that include the video frame (e.g., thumbnail image) associated with the thumbnail image time.

For each event from at least one event (e.g., aggregated event), at 1211, the method 1200 includes generating a preview image clip that includes the video frame and the video segment. In some implementations, the method 1200 can include generating two image preview sequences based on the user request including two or more objects of interest. The video frame, that can be used to generate the preview image clip, can depict the two or more objects of interest.

For each event from at least one event (e.g., aggregated event), at 1213, the method 1200 includes cause display of the preview image clip to a user associated with the user request. In some implementations, the user can operate a user compute device (e.g., frontend) that includes a GUI. The preview image clip can be presented on the GUI for the user to view. In some implementations, the GUI can initially display the preview image clip with the video frame (e.g., thumbnail image) as the video frame that the user views first (or displayed first), such that the video frame transitions to the video segment in response to a user interaction with the video frame. The user interaction can include positioning (e.g., hovering) a cursor of within a portion of the video frame and/or the preview sequence image and/or by clicking the video frame and/or the preview sequence image.

Figure 13:
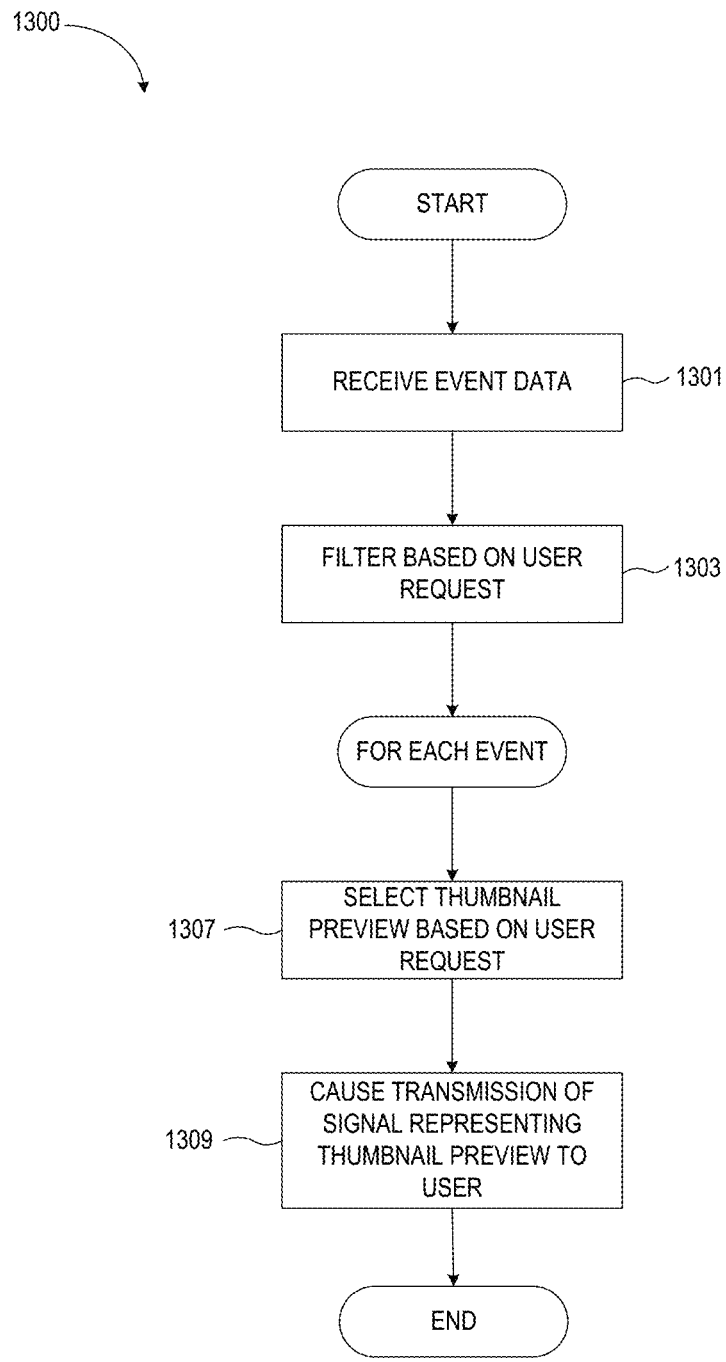
FIG. 13 is a flow diagram of a computer-implemented method for identifying object events based on filtered data by a compute device and based on user request, according to some embodiments.

FIG. 13 is a flow diagram of a method 1300 of a computer-implemented method for identifying object events based on filtered data by a compute device and based on a user request, according to some embodiments. In some implementations, the method 1300 can be performed by a backend and/or a processor of a compute device that is the backend. In some implementations, the method 1300 can be performed automatically.

At 1301, the method 1300 includes receiving event data including a set of video/image frames generated by at least one sensor of a video camera. In some implementations, the event data can include information about a location, direction, speed, and duration of detected motion of objects as well as information about a confidence level of the detection of motion of objects. In some implementations, the event data can include feature vectors (e.g., 2D vectors) describing location, direction, speed, and/or duration of detected motion of objects. In some implementations, the event data can be received from a camera (e.g., video camera) via an execution of a data migration of event data generated by the camera. In some implementations, the event data can include data captured at a rate of between about 0.5 frames per second and about 3 frames per second. In some implementations, the event data includes a set of video segments, each of which includes a duration of between about 10 seconds and about 30 seconds At 1303, the method 1300 includes filtering the event data based on a user request, to produce filtered event data. In some implementations, the filtered event data can include event data specific to the user request. In some implementations, the filtered event data can include, for example, filtered object events. In some implementations, the filtering can be based on features such as, for example, display area, object class label or type (e.g., object identifiers: person, vehicle, tree, etc.), timeframe, and/or the like. The user request can be consistent with any user request as described herein. For example, the region of interest can include a portion of the display area. In other words, the display area can be a scene that a camera records videos or video/image frames of and the region of interest can include a portion of the scene that a user is interested in. In some instances, the timeframe of interest can include a specific time in the video of the display area recorded by the camera, a time window (e.g., a duration within a particular window of time) that the user is interested in. In some instances, the object of interest can be a specific object that the user is interested in. In some implementations, the processor can receive multiple user requests in parallel from different users. In some implementations, the processor can filter the event data via the search filter 223 of FIG. 2.

In some implementations, the filtered event data can include an aggregation of multiple events (e.g., an aggregated event). For instance, the filtered event data can include one or more object detections. In some instances, the processor can combine each event describing an object detection, based on the user request, into a single event (e.g., aggregated event). The single event can serve to consolidate multiple events (or object detections) for computationally efficient tracking. In some cases, the single event can include a larger bounding box that can be overlayed around the one or more events retrieved. Computational overhead can be reduced when processing events for objects that share features.

For each event from at least one event (e.g., aggregated event), at 1307, the method 1300 includes selecting a thumbnail preview based on the user request. In some implementations, the thumbnail preview can be consistent with the video thumbnail as described herein. In some implementations, the thumbnail preview can be determined and/or presented such that a thumbnail image and/or thumbnail time of the thumbnail preview can be selected via a ranking algorithm. For example, a thumbnail time can be assigned a ranking based on the user request.

For example, the processor can select a timeframe from at least one event (or the aggregated event) that best matches the user request. For example, if the user request includes a timeframe of interest, that timeframe can be ranked the highest and be selected as a thumbnail time while timeframes further from the timeframe of interest are ranked lower. If the user request includes a time window of interest, a timeframe closer to the middle of the time window can be ranked higher than timeframes further from the middle of the time window, in which the timeframe closest to the middle of the time window can be selected to be the thumbnail time. If the user request includes a region of interest, timeframes associated with more objects inside the region of interest can be ranked higher than timeframes associated with less objects inside the region of interest, in which the timeframe associated with the highest number of objects can be selected to be the thumbnail time. If the user request includes an object of interest, timeframes associated with the object of interest located closer to the center of a scene can be ranked higher than timeframes associated with the object of interest located further from the center of the scene, in which the timeframe associated with the object of interest closest to the center of the scene can be selected to be the thumbnail time.

In some implementations, the processor can aggregate multiple events retrieved based on a degree of overlap of time windows and/or of timeframe among the events. For example, in a video, two or more events depicting detections of moving objects that share a common "screen time" or that are captured within a predefined minimum number (or predetermined threshold) of video/image frames can be selected by the processor to be combined (or aggregated) to generate an aggregated event. Alternatively or additionally, and in some implementations, the processor can combine events based on an average number (or predetermined number) of events (or representations of object detections) in non-overlapping time windows across video/image frames, to generate a single event (e.g., aggregated event).

To align with the thumbnail time, the processor can retrieve a video segment stored in the database and process the video segment (e.g., decryption, decoding, caching, etc.) to extract a video/image frame aligned with the selected thumbnail time and that is designated to be the thumbnail preview. In some implementations, for each event from at least one event, the processor can generate a preview image clip that includes the thumbnail preview. The thumbnail preview can include the video segment associated with the at least one event (e.g., aggregated event). In some implementations, the user request can include two or more objects of interest including the object of interest, and for each event from the at least one event, the associated video/image frame includes a depiction of at least one object of interest from the two or more objects of interest.

In some instances, the thumbnail preview selected for each object event can be based on a number of objects depicted in the thumbnail preview. For example, if the user request indicates a region of interest or a timeframe of interest, the thumbnail preview selected can include a video/image frame that includes a higher number of objects depicted in the video/image frame. In another example, if the user request indicates an object of interest the thumbnail preview selected can depict the object of interest closer to the center of the scene (or display area of the scene).

For each event from at least one event (e.g., an aggregated event), at 1309, the method 1300 includes cause transmission of a signal representing the thumbnail preview to cause display of the thumbnail preview to a user associated with the user request via a GUI as part of a preview image clip. In some implementations, the user can operate a user compute device (e.g., frontend) that includes the GUI. The preview image clip can be presented on the GUI for the user to view. In some implementations, the GUI can initially display the preview image clip with the video/image frame (e.g., thumbnail preview) as the video/image frame that the user views first (or displayed first), such that the video/image frame transitions to the video segment in response to a user interaction with the video/image frame. The user interaction can include positioning (e.g., hovering) a cursor of within a portion of the video/image frame and/or the preview sequence image and/or by clicking the video/image frame and/or the preview sequence image. In some implementations, the thumbnail preview selected that includes an object of interest can be based on a degree of centrality of the object of interest within the display area of the GUI. "Degree of centrality," as used herein, can refer to how centered the object of interest is within the display area of the GUI, or a proximity to a center of the display area of the GUI of the object of interest.

Figure 14:
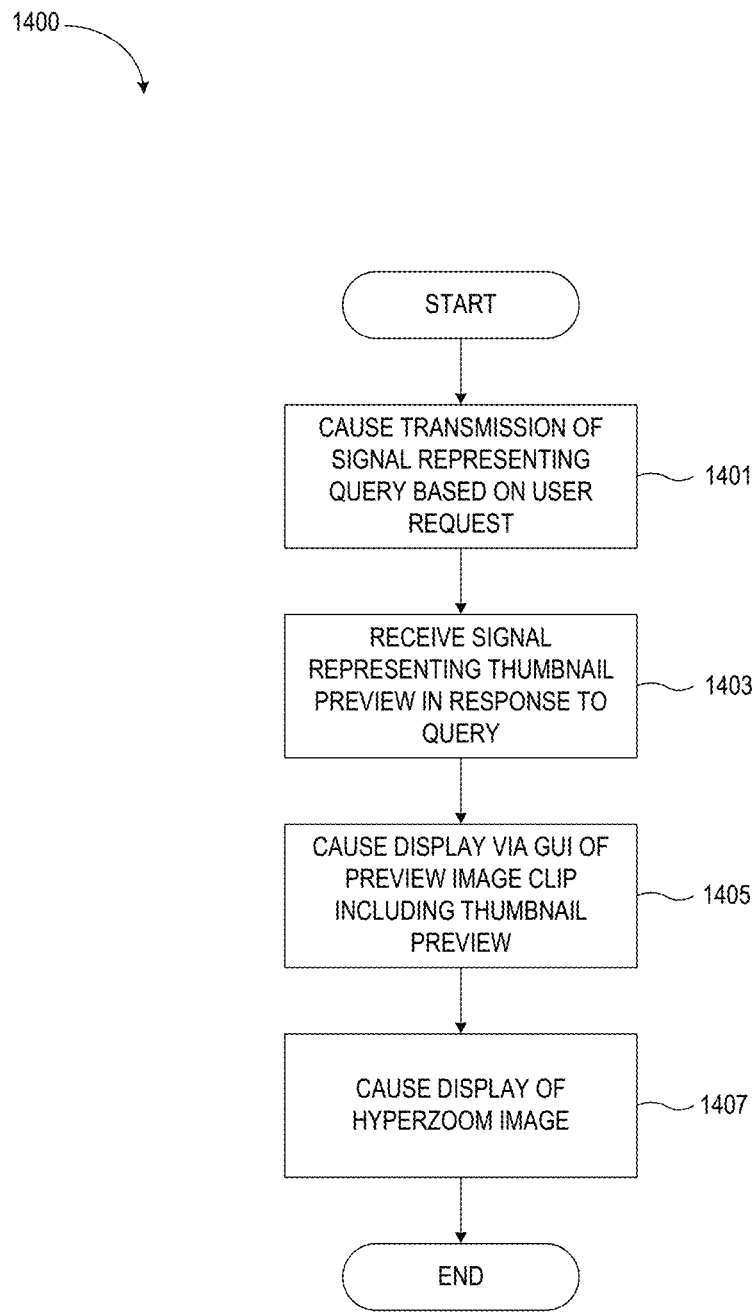
FIG. 14 is a flow diagram of a computer-implemented method for requesting user request and receiving search results by a compute device, according to some embodiments.

FIG. 14 is a flow diagram of a method 1400 of a computer-implemented method for requesting user request and receiving search results by a compute device, according to some embodiments. In some implementations, the method 1400 can be performed by a processor at a frontend of a compute device (e.g., a user compute device). In some implementations, the method 1400 can be performed and/or executed automatically.

At 1401, the method 1400 includes causing transmission, via the processor of the compute device, a signal representing a query based on a user request, the user request indicating at least one of: a region of interest associated with a display area, a timeframe of interest, or an object of interest. The user request can be consistent with any user request as described herein.

At 1403, the method 1400 includes receiving, via the processor, a signal representing a thumbnail preview in response to the query. The thumbnail preview can include motion detection data generated by at least one sensor (e.g., motion sensor/detector) of a camera (e.g., video camera). In some implementations, the thumbnail preview can be consistent with any thumbnail preview or thumbnail image as described herein. In some implementations, the thumbnail preview can include data captured at a rate of between about 0.5 frames per second and about 3 frames per second by the sensor. In some implementations, the thumbnail preview can be associated with at least one video segment having a duration of between about 10 seconds and about 30 seconds. In some implementations, the thumbnail preview can be selected based on a number of objects depicted in the thumbnail preview.

At 1405, the method 1400 includes causing display, via a GUI of a user associated with the user request, of a preview image clip that includes the thumbnail preview and the video segment, such that the thumbnail preview transitions to the video segment in response to a user interaction with the preview image clip. The preview image clip can be consistent with any preview image clip as described herein. In some implementations, the method 1400 can including displaying multiple preview image clips including the preview image clip. In some implementations, the multiple preview image clips can be presented in a grid layout.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification. Appropriate software coding can readily be prepared by skilled programmers based on the teachings of the present disclosure. Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, sub-routines, functions, procedures, etc. "Instructions" and "code" can comprise a single computer-readable statement or many computer-readable statements.

The term "modules" can be, for example, distinct but interrelated units from which a program may be built up or into which a complex activity may be analyzed. A module can also be an extension to a main program dedicated to a specific function. A module can also be code that is added in as a whole or is designed for easy reusability.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of,"

will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B,") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the terms "about" and "approximately" generally mean plus or minus 10% of the value stated, for example about 250 μm would include 225 μm to 275 μm, about 1,000 μm would include 900 μm to 1,100 μm.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A non-transitory, processor-readable medium storing instructions that, when executed by a processor, cause the processor to:
receive, at a processor, a user request including a representation of at least one of: a region of interest associated with a display area or a timeframe of interest;
send, via the processor, a signal to cause execution of a query;
receive, at the processor and in response to the query, a signal representing at least one event result including at least one aggregated event, based on a temporal overlap of at least one feature;
for each event result from the at least one event result:
select a preview image including a thumbnail image or a video frame, based on the user request and using a ranking algorithm;
receive, at the processor, event metadata associated with the preview image;
retrieve, from a memory operably coupled to the processor and based on the event metadata, a video segment associated with the preview image; and
cause display of a preview image sequence or the video segment to a user associated with the user request.

2. The non-transitory, processor-readable medium of claim 1, wherein the user request includes a representation of at least two objects of interest, and for each event result from the at least one event result, the associated preview image includes a depiction of the at least two objects of interest.

3. The non-transitory, processor-readable medium of claim 1, wherein the user request includes a representation of at least two objects of interest, and for each event result from the at least one event result, the associated video frame includes a depiction of at least one object of interest from the at least two objects of interest.

4. The non-transitory, processor-readable medium of claim 1, wherein the instructions to cause display of the preview image include instructions to cause display of a preview image clip via a graphical user interface of a user compute device, such that the preview image is displayed first, and the video frame transitions to the video segment in response to a user interaction with the preview image.

5. The non-transitory, processor-readable medium of claim 4, wherein the user interaction includes hovering a cursor over the preview image.

6. A non-transitory, processor-readable medium storing instructions that, when executed by a processor, cause the processor to:
receive, via the processor, event data including a representation of an aggregated event, based on a temporal overlap of at least one feature, the event data generated by at least one sensor of a video camera;
filter the event data based on a user request, to produce filtered event data, the user request including a representation of at least one of: (1) a region of interest associated with a display area, (2) a timeframe of interest, or (3) at least one object of interest;
for each event from a set of at least one event associated with the filtered event data:
select a preview image including at least one of a thumbnail image or a video frame, based on the user request, and
cause transmission of a signal representing the preview image to cause display of the preview image to a user associated with the user request via a graphical user interface (GUI).

7. The non-transitory, processor-readable medium of claim 6, wherein the user request includes a representation of at least two objects of interest including the at least one object of interest, and for each event from the set of at least one event associated with the filtered event data, the preview image includes a depiction of the at least two objects of interest.

8. The non-transitory, processor-readable medium of claim 6, wherein the instructions to select the preview image for each object event from the at least one object event include instructions to select the thumbnail preview for each object event from the at least one object event based on a degree of centrality of the at least one object of interest within a display area of the GUI.

9. The non-transitory, processor-readable medium of claim 6, wherein the instructions to select the preview image for each object event from the at least one object event include instructions to select the preview image based on a number of objects depicted in the preview image.

10. The non-transitory, processor-readable medium of claim 6, wherein the event data includes data captured at a rate of between about 0.1 frames per second and about 100 frames per second.

11. The non-transitory, processor-readable medium of claim 6, wherein the event data includes a plurality of video segments, each video segment from the plurality of video segments having a duration of between about 1 seconds and about 300 seconds.

12. The non-transitory, processor-readable medium of claim 6, wherein the object events are generated by aggregating object detection results based on at least one of: a number of detected objects, a detection bounding box location, an object detection confidence, or one or more object detection feature similarities.

13. The non-transitory, processor-readable medium of claim 6, wherein the instructions to cause the processor to filter the event data include instructions to cause the processor to filter the event data based on at least one of: a class label, one region of interest, one time window, or motion detection data.

14. The non-transitory, processor-readable medium of claim 6, wherein the user request includes a representation of at least two objects of interest including the at least one object of interest, and the preview image includes a depiction of at least one object of interest from the at least two objects of interest.

15. A non-transitory, processor-readable medium storing instructions that, when executed by a processor, cause the processor to:
  cause transmission of a signal representing a query based on a user request, the user request including a representation of at least one of: a region of interest associated with a display area, a timeframe of interest, or an object of interest;
  receive a signal representing a preview image in response to the query, a preview image including a representation of an aggregated event, based on a temporal overlap of at least one feature, the signal generated by at least one sensor of a video camera;
  cause display, via a graphical user interface (GUI) of a user associated with the user request, of a preview image clip that includes the preview image and a video segment, such that the preview image transitions to the video segment in response to a user interaction with the preview image; and
  cause display, via the GUI and concurrently with the display of the preview image clip, of at least one hyperzoom image.

16. The non-transitory, processor-readable medium of claim 15, further storing instructions to cause the processor to cause display of a plurality of preview image clips including the preview image clip.

17. The non-transitory, processor-readable medium of claim 16, wherein the instructions to cause the processor to cause display of the plurality of preview image clips include instructions to cause the processor to cause display of the plurality of preview image clips in a grid layout.

18. The non-transitory, processor-readable medium of claim 15, wherein the at least one sensor includes a motion sensor.

19. The non-transitory, processor-readable medium of claim 15, wherein the aggregated event includes data captured at a rate of between about 0.5 frames per second and about 3 frames per second.

20. The non-transitory, processor-readable medium of claim 15, wherein the preview image is associated with at least one video segment having a duration of between about 10 seconds and about 30 seconds.

21. The non-transitory, processor-readable medium of claim 15, wherein the preview image is a thumbnail image selected based on a number of objects depicted therein.

* * * * *